United States Patent
Little et al.

(10) Patent No.: US 7,809,953 B2
(45) Date of Patent: Oct. 5, 2010

(54) SYSTEM AND METHOD OF SECURE AUTHENTICATION INFORMATION DISTRIBUTION

(75) Inventors: Herbert A. Little, Waterloo (CA); Michael G. Kirkup, Waterloo (CA); Ian M. Robertson, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 916 days.

(21) Appl. No.: 10/730,183

(22) Filed: Dec. 8, 2003

(65) Prior Publication Data

US 2004/0172531 A1 Sep. 2, 2004

Related U.S. Application Data

(60) Provisional application No. 60/431,737, filed on Dec. 9, 2002, provisional application No. 60/440,359, filed on Jan. 16, 2003.

(51) Int. Cl.
*G06F 21/00* (2006.01)
(52) U.S. Cl. .............. 713/184; 713/182; 713/185; 726/5; 726/6
(58) Field of Classification Search .............. 726/3, 726/8, 5, 6, 7, 9; 380/278, 279; 713/168, 713/182, 184, 185
See application file for complete search history.

(56) References Cited

U.S. PATENT DOCUMENTS

| | | | |
|---|---|---|---|
| 5,497,421 A | 3/1996 | Kaufman et al. | |
| 5,684,950 A | 11/1997 | Dare et al. | |
| 5,812,764 A | 9/1998 | Heinz, Sr. | |
| 6,161,185 A * | 12/2000 | Guthrie et al. | 726/5 |
| 6,615,353 B1 * | 9/2003 | Hashiguchi | 713/185 |
| 6,880,079 B2 * | 4/2005 | Kefford et al. | 713/155 |
| 2004/0187018 A1 * | 9/2004 | Owen et al. | 713/200 |

FOREIGN PATENT DOCUMENTS

| | | |
|---|---|---|
| EP | 0 844 551 A2 | 5/1998 |
| EP | 0 844 551 A3 | 5/1998 |
| EP | 1 107 089 A1 | 6/2001 |
| WO | WO 95/19593 | 7/1995 |
| WO | WO 96/00485 | 1/1996 |
| WO | WO 00/48064 A1 | 8/2000 |

OTHER PUBLICATIONS

"Virtual Token Leaves No Footprint", Signal Magazine, Sep. 2002, http://www.securecomputing.com/pdf/HSK-Virtual_sept02.pdf.

* cited by examiner

*Primary Examiner*—Kimyen Vu
*Assistant Examiner*—Edward Zee
(74) *Attorney, Agent, or Firm*—Conley Rose, P.C.; J. Robert Brown, Jr.

(57) ABSTRACT

A system and method of distributing authentication information for remotely accessing a computer resource. A request for authentication information, including identity information, is received from a user of a remote device. When the user is authenticated based on the identity information, requested authentication information is retrieved and returned to the remote device. The authentication information, or information generated from the authentication information, is then used for remotely accessing the computer resource.

19 Claims, 11 Drawing Sheets

SYSTEM AND METHOD OF SECURE AUTHENTICATION INFORMATION DISTRIBUTION

CROSS-REFERENCE TO RELATED APPLICATIONS

This application claims benefit of and priority to U.S. provisional application Ser. No. 60/431,737 (entitled "System and Method of Secure Seed Distribution" filed Dec. 9, 2002) and to U.S. provisional application Ser. No. 60/440,359 (entitled "System and Method of Secure Distribution of Authentication Information" filed Jan. 16, 2003). By this reference, the full disclosures, including the drawings, of U.S. provisional application Ser. Nos. 60/431,737 and 60/440,359, are incorporated herein by reference.

BACKGROUND

1. Technical Field

This invention relates generally to remote computer system access control, and in particular to secure distribution of authentication information used in user authentication.

2. Description of the State of the Art

In a computer network, network resources are accessible to computer systems or devices which are connected in the network. Many computer networks also support remote access to network resources from computer systems or devices external to the network. For remote access, two-factor authentication is often used to control network access. Two-factor authentication is based on something a user knows, such as a password, and something the user has, such as an access code generator or token. In order to remotely access a network, a user provides authentication information including the password and the access code.

In a known two-factor authentication scheme, the code generator is a hardware component which stores a secret key or "seed", which is shared between the code generator and an authentication system at the computer network, and a code generation algorithm. The code generation algorithm generates an access code, valid for a relatively short period of time, using the seed and a current time, and the access code is displayed on a user interface. The user enters the access code and transmits the access code and other required authentication information to the authentication system at the computer network. The authentication system then retrieves the user's seed from a store at the computer network, and uses the same algorithm and a current time to calculate an access code that should have been generated at the code generator. When the received access code and the calculated access code match, or the received code is within a predefined range or window of past or future access code values, then remote access to the computer network is granted.

Hardware code generators tend to be physically small and are thus prone to being misplaced or damaged. When a user travels with a laptop computer but forgets the hardware token, for example, the user cannot remotely access a computer network without intervention by a network owner or administrator. Although software-based code generators installed on a computer system or device from which a user remotely accesses the computer network alleviate the problem of lost or forgotten hardware code generators, seeds used in access code generation must be shared only between the network authentication system and the code generator. Known seed distribution techniques involve email, requiring network administrator intervention to retrieve and insert each user's seed into an email message, or use of a particular seed transfer mechanism such as a serial connection to a networked computer system. As well, email is generally not desirable because a copy of the seed is stored, for example, in an email system and data backups. Encrypting messages containing seeds could address these concerns, but creates an encryption key distribution problem. More automated and convenient systems and methods of securely distributing seeds to such computer systems and devices are therefore desirable.

SUMMARY

In accordance with the teachings disclosed herein, systems and methods are provided for use in distributing authentication information in order to remotely access a computer network. For example, a request for the authentication information may be received from a user of a remote device, wherein the request comprises identity information. The user is authenticated based on the identity information in the request, and the authentication information is returned to the remote device if the user is authenticated.

In an alternate embodiment, systems and methods are provided for distributing seeds for use in generating access codes for user authentication, including receiving a seed request from a remote device, the seed request comprising authentication information that includes an access code generated using a seed, retrieving the seed from a seed store, calculating an access code using the retrieved seed, determining whether the calculated access code matches the received access code in the authentication information, and returning the retrieved seed to the remote device where the calculated access code matches the received access code.

Other embodiments may be included without limitation, such as computer software and computer-readable media that have instructions for performing the authentication information distribution methods as well as data signals which are used to convey information among the systems and devices involved in distribution of authentication information.

Further features of seed distribution systems and methods will be described or will become apparent in the course of the following detailed description.

DETAILED DESCRIPTION

Figure 1:
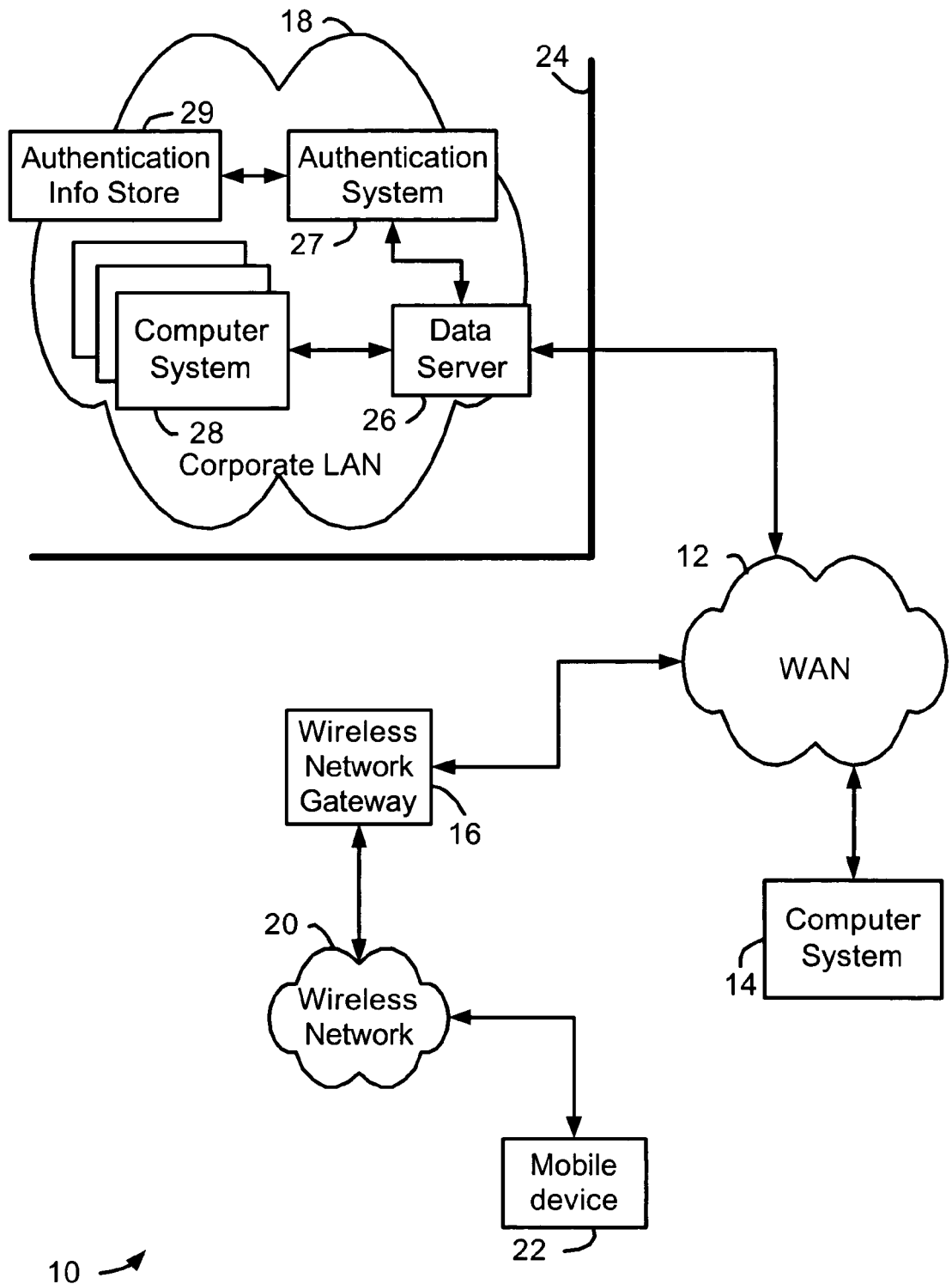
FIG. 1 is a block diagram showing a computer network supporting remote access.

FIG. 1 is a block diagram showing a computer network supporting remote access. The communication system 10 in FIG. 1 includes a Wide Area Network (WAN) 12, coupled to a computer system 14, a wireless network gateway 16, and a corporate Local Area Network (LAN) 18. The wireless network gateway 16 is also connected to a wireless communication network 20 in which a wireless mobile communication device, the mobile device 22, is configured to operate.

The computer system 14 is a desktop or laptop personal computer (PC), which is configured to communicate to the WAN 12, the Internet for example. PCs, such as the computer system 14, normally access the Internet through an Internet Service Provider (ISP), Application Service Provider (ASP), or the like.

The corporate LAN 18 is a typical working environment, in which multiple computers 28 are connected in a network which also supports access by remote devices such as the computer system 14 and the mobile device 22. Such a network is often located behind a security firewall 24. Within the corporate LAN 18, a data server 26, operating on a computer behind the firewall 24, acts as the primary interface for the corporation to exchange data both within the LAN 18, and with other external systems and devices via the WAN 12. Although a data server 26 is shown in the LAN 18, those skilled in the art will appreciate that a LAN may include more than one data server, and other types of servers supporting network resources.

The wireless gateway 16 provides an interface to a wireless network 20, through which data may be exchanged with a mobile device 22. The mobile device 22 may, for example, be a data communication device, a dual-mode communication device such as a mobile telephone having both data and voice communications functionality, a multiple-mode device capable of voice, data and other types of communications, a personal digital assistant (PDA) enabled for wireless communications, or a laptop or desktop computer system with a wireless modem, for example. An exemplary mobile device is described in further detail below.

Such functions as addressing the mobile device 22, encoding or otherwise transforming messages for wireless transmission, or other necessary interface functions are performed by the wireless network gateway 16. The wireless network gateway 16 may be configured to operate with more than one wireless network 20, in which case the wireless network gateway 16 also determines a most likely network for locating the mobile device 22 and possibly tracks mobile devices as users roam between countries or networks. Although only a single wireless network gateway 16 is shown in FIG. 1, mobile devices are often configured to communicate with more than one gateway, such as a corporate network gateway and a Wireless Application Protocol (WAP) gateway, for example. Alternatively, private wireless network gateways such as wireless Virtual Private Network (VPN) routers could be implemented to provide a private interface to a wireless network. A wireless VPN implemented in the LAN 18 provides a private interface from the LAN 18 to one or more mobile devices such as 22 through the wireless network 20 without requiring the wireless network gateway 16.

A wireless network 20 normally delivers data to and from communication devices such as the mobile device 22 via RF transmissions between base stations and devices. The wireless network 20 may, for example, be a data-centric wireless network, a voice-centric wireless network, or a dual-mode network that can support both voice and data communications over the same infrastructure. Recently developed voice and data networks include Code Division Multiple Access (CDMA) networks, Groupe Special Mobile or the Global System for Mobile Communications (GSM) and General Packet Radio Service (GPRS) networks, and third-generation (3G) networks like Enhanced Data rates for Global Evolution (EDGE) and Universal Mobile Telecommunications Systems (UMTS), which are currently under development. Older data-centric networks include, but are not limited to, the Mobitex™ Radio Network ("Mobitex"), and the DataTAC™ Radio Network ("DataTAC"), and known voice-centric data networks include Personal Communication Systems (PCS) networks like GSM and Time Division Multiple Access (TDMA) systems that have been available in North America and world-wide for several years.

In the system 10, a company which owns the corporate LAN 18 may provide employees with remote access to the corporate LAN 18 via any of a variety of remote devices, including mobile devices such as 22, or external laptop and desktop computers such as 14. Network resources on the LAN 18 are then accessible whether the user is at an office computer system 28 in the LAN 18, or at a remote location using the mobile device 22 or the computer system 14. As described above, two-factor authentication is used in the LAN 18 to authenticate a user requesting remote access to the LAN 18. A remote user inputs authentication information such as a network user name, a network password, and an access code generated by a code generator, at a remote device in order to access the LAN 18.

The authentication system 27 authenticates users requesting remote access to the LAN 18. In the system 10, remote access control uses two-factor authentication based on authentication information, such as a user password and an access code generated using a shared secret seed, for example. At the LAN 18, authentication information for each user authorized for remote access is stored in the authentication information store 29 (e.g., a seed store). It should be appreciated that other information from which authentication information is generated, such as a seed from which an access code is generated by a remote access code generator and the authentication system 27, may also or instead be stored in the authentication information store 29.

The authentication information store 29 may be indexed (e.g., is searched) by user name or another identifier associated with each user authorized for remote access to the LAN 18. Where the authentication information store 29 stores seed values used to generate access codes, for example, code generator serial numbers associated with each authorized user could instead be used to index the authentication information store 29, so that the authentication system 27 is able to identify and access the correct seed when a user is to be authenticated. Since stored authentication information is secret and user-specific, the authentication information store 29 is a secure store which is preferably accessible only to authorized parties or systems such as network administrators and the authentication system 27. Although shown as a separate block in FIG. 1, the authentication system 27 may be incorporated into the data server 26 or another server in the LAN 18 in alternative embodiments. Client and server types of implementations are also contemplated, in which each protected network resource is configured to operate in conjunction with an authentication client, which interacts with an authentication server. For example, the authentication server authenticates users attempting to access protected network resources, and the authentication clients grant access to protected network resources to authenticated users.

Figure 2:
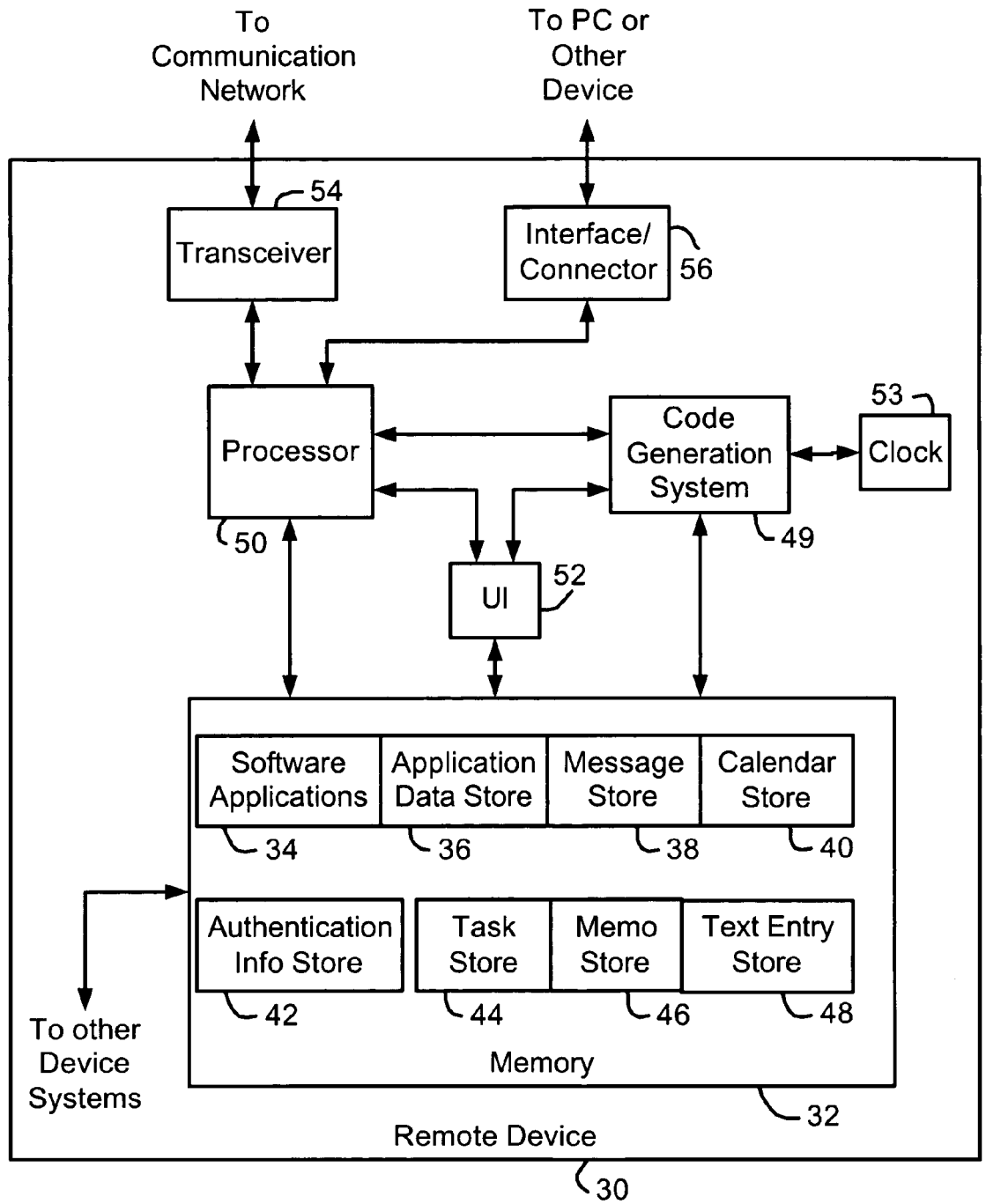
FIG. 2 is a block diagram of a remote device enabled for secure seed distribution and access code generation.

FIG. 2 is a block diagram of a remote device enabled for secure authentication information distribution. It should be apparent to those skilled in the art that components involved in an authentication information distribution are shown in FIG. 2. A remote device such as the mobile device 22 or the computer system 14 in FIG. 1 typically includes further components in addition to those shown in FIG. 2.

The mobile device 30 comprises a memory 32, a processor 50, a user interface (UI) 52, a clock 53, a transceiver 54, and an interface or connector 56. The memory 32 includes a storage area 34 for software applications, an authentication information store 42, and a plurality of data stores 36, 38, 40, 44, 46 and 48. In some embodiments, the mobile device may also include a code generation system 49.

The memory 32 is, or at least includes, a writeable store such as a random access memory (RAM) into which other device components write data. Software applications that have been installed on the remote device 30 are stored in the software applications store 34. These software applications include one or more software applications through which a computer network, such as the LAN 18 in FIG. 1, is remotely accessible, and possibly software applications that communicate with other entities or manage on-device functions. Software applications may also perform more than one type of function and remotely access more than one computer network.

The application data store 36 stores information associated with the software applications on the remote device 30, including, for example, cached web pages for a browser application, files used by software applications, and possibly configuration data for software applications. Electronic messages such as received and/or sent email messages are stored in the message store 38. Data such as schedule information, appointments, and reminders are stored in the calendar store 40. The task store 44 is used to store tasks that a user wishes to track. Notes and memos entered by a user are stored in the memo store 46. The text entry store 48 stores a word list or dictionary which supports, for example, predictive text entry and automatic error correction when text is entered on the remote device 30.

The authentication information store 42 stores authentication information. For example, a secret seed used to generate an access code for remotely accessing a computer network using the remote device 30 may be stored in the authentication information store 42. Such a seed is specific to a particular user of the remote device 30, and is also stored at the computer network to be remotely accessed. The authentication information store 42 is preferably located in a secure memory location, protected by a user password, for example. Authentication information may also or instead be stored to the authentication information store 42 in encrypted form, such that a password is required to decrypt the authentication information when it is needed. In alternative embodiments, the authentication information store 42 is implemented in a smart card or other device, such as a Universal Serial Bus (USB) token or Secure Digital (SD) card, for example, that can be attached to the remote device 30. In this manner, the authentication store 42 is provided in a separate, secure memory component.

Although shown as separate data stores, those skilled in the art will appreciate that some or all of the stores could be consolidated into a single data store in the memory 32. It should also be apparent that a remote device may include further, fewer, or different data stores than those shown in FIG. 2.

The processor 50 is connected (e.g., has a data pathway) to the transceiver 54 and thus enables the remote device 30 for communication via a communication network. In a device such as the mobile device 22 (FIG. 1), the transceiver 54 is a wireless transceiver or wireless modem configured for communications in a wireless network. Alternatively, the transceiver 54 is a wired modem or network card where the remote device 30 is a computer system which communicates via a WAN or the Internet. Incorporating more than one type of transceiver 54 in the remote device 30 enables the remote device 30 for communication in different types of communication network.

The interface/connector 56 provides an alternate communication path to a PC or other device having a co-operating interface or connector. The interface/connector 56 could be any of a plurality of data transfer components, including, for example, an optical data transfer interface such as an Infrared Data Association (IrDA) port, some other short-range wireless communications interface, or a wired interfaces such as serial or Universal Serial Bus (USB) port. Known short-range wireless communications interfaces include, for example, BLUETOOTH® modules and 802.11 modules. It will be apparent to those skilled in the art that BLUETOOTH® and 802.11 denote sets of specifications, available from the Institute of Electrical and Electronics Engineers (IEEE), relating to wireless LANs and wireless personal area networks, respectively. Therefore, a communication link established via the interface/connector 56 may be a wireless connection or a physical wired connection.

The UI 52 includes such components as a keyboard or keypad, a display, or other components which accept inputs from or provide outputs to a user of the remote device 30. Although shown as a single block in FIG. 2, a remote device 30 typically includes more than one UI, and the UI 52 is therefore intended to represent one or more user interfaces.

In the remote device 30, the code generation system 49 is either a hardware- or software-based access code generator, although a software-based access code generator is preferred. The code generation system 49 embodies a generator algorithm which generates access codes for use in two-factor authentication for remote computer network access, based on the seed in the authentication store 42 and the current time from the clock 53. The clock 53 provides either a current time or a timing signal, from a local oscillator or frequency synthesizer, for example, from which a current time is calculated by the code generation system 49.

FIGS. 1 and 2 are used to illustrate an example of handling user authentication. With reference to FIG. 1, a user of the remote device 30 requests authentication information from the computer network to which remote access is desired. A request is prepared at the remote device 30, including user information, account information, and preferably additional identity information. The identity information identifies the particular user or corresponding authentication information being requested, and allows the computer network, or a component or system thereof, to authenticate the user requesting the authentication information. Thus, the request includes identity information which authenticates a user to a system or component at the computer network from which authentication information, stored at the computer network, is requested. The requested authentication information is required for accessing network resources from a remote device. Thus, the identity information is used to authenticate the user during distribution of the authentication information from a computer network to a remote device, and the authentication information is subsequently used to authenticate the user for remotely accessing the computer network and its resources, or possibly one or more specific resources of the computer network. Although both the identity information and the authentication information authenticate a user to a component of a computer network, the authentication information includes a password or access code which is not known to a user of a remote device but is required for remote access to resources in the computer network.

The identity information in the request preferably enables two-factor authentication at the computer network, and includes, for example, a password entered by a user of the remote device 30 and a digital signature generated based on a transformation of at least a portion of the information in the request, a signature key, and a signature algorithm. In this example, the two authentication factors are the network password (something that a user knows), and the signature key (something the user has). Depending upon the particular type of remote access implementation, other identity information may also or instead be used to authenticate a user requesting authentication information from a computer network. The data server 26 or some other component in the LAN 18 maintains a record of associations between users and remote devices. It is noted that a remote device serial number or other identifier of the remote device from which a request originated is another possible authentication factor. The user's particular remote device itself is then an authentication factor representing something that the user has.

The request for authentication information is preferably transmitted to the computer network via a secure communication link, such as a Secure Hypertext Transfer Protocol (S-HTTP) connection, a Secure Sockets Layer (SSL) connection, or a Transport Layer Security (TLS) connection. Thus, the authentication information request may be an SSL connection request, for example. Secure email schemes, such as Secure Multipurpose Internet Mail Extensions (S/MIME) and Pretty Good Privacy™ (PGP™), and other secure messaging techniques are other possible transports for authentication information requests.

At the computer network, user authentication operations based on the identity information in the request are performed to determine whether the request was sent by the user whose authentication information is being requested. Since the authentication information is associated with a particular user, it may be provided to that user only in response to a request (unless the situation dictates otherwise). Where the request includes a network password and a digital signature, for example, then the password and digital signature are verified before the authentication information is returned. This authenticates the user to the computer network component or system which manages authentication information distribution. The authentication information stored at the computer system is retrieved and returned to the remote device where the user is authenticated.

User authentication during distribution of stored authentication information ensures that a user can retrieve his or her own corresponding authentication information, and not authentication information associated with any other users. This user authentication allows authentication information distribution to be completed without intervention by an administrator at the computer network or restriction of authentication information distribution to a particular communication interface. Where stored authentication information is accessible through an automatic entity such as a web server, to which access is controlled based on user authentication, stored authentication information is automatically returned in response to a request from an authenticated user, thereby further simplifying distribution of stored authentication information.

In the system 10 of FIG. 1, a request from the mobile device 22, for example, is received by the data server 26. In a preferred embodiment, the data server 26 performs user authentication for a received request based on the identity information in the request. Where the request includes a password and a digital signature, for example, the data server checks the password in the request to determine whether the password included in the request is correct. Password checking operations are well known to those skilled in the art to which the present application pertains.

The data server 26 also checks the digital signature using a signature key and algorithm corresponding to the signature key and algorithm used to generate the digital signature. For example, many known signature algorithms use a signature public/private key pair. The signature private key is used by a signer to generate a digital signature and is known only to the signer, whereas the signature public key is available from a key source such as a public key server (PKS), accessible through the Internet, for example, and is used to verify a digital signature generated using the corresponding signature private key. Thus, where the digital signature in the request was generated using a user's signature private key, the data server 26 obtains the user's signature public key from a PKS (not shown) connected to the WAN 12 or possibly the LAN 18, and checks the digital signature using the signature public key. If the digital signature is verified, then any signed information in the request has not been changed since it was signed, and the request was signed by the user's signature private key.

Where both the password and the digital signature are verified, the user is authenticated. The user submitting the request knows the correct password and has the signature private key. Provided the user is requesting his or her own authentication information, the authentication information is retrieved from the authentication information store 29 and returned to the mobile device 22. In FIG. 1, the data server 26 requests the authentication information from the authentication system 27, although in an alternative embodiment, the data server 26 retrieves the requested authentication information from the authentication information store 29. In a still further embodiment, the authentication system 27 performs user authentication for authentication information distribution as well as for remote access.

With reference to FIG. 2, once a user's authentication information has been returned to the remote device 30 and stored to the authentication information store 42, the authentication information stored at the computer network and required for accessing the computer network is available at the remote device 30.

A request mechanism as disclosed herein allows authentication information such as a seed value or an access code required for remote access to the computer network to be requested from the computer network even though a user has misplaced access codes. The user is able to remotely access the computer network using the requested stored authentication information even though the code generator is not available. In this example, a code generator simplifies remote access operations in that authentication information stored at the computer network need not be requested when the code generator is available, but is not essential for remote access.

Figure 3:
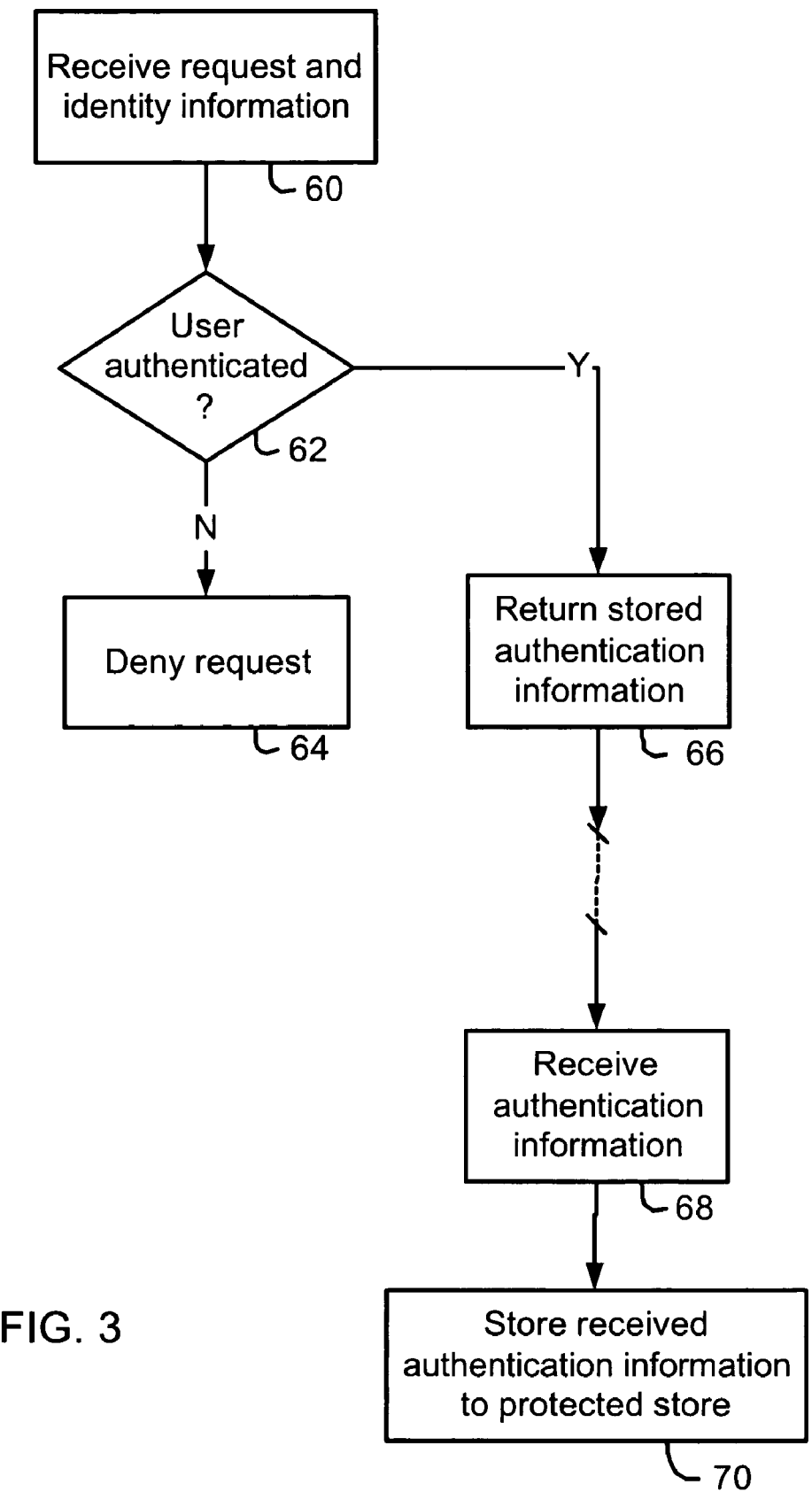
FIG. 3 is a flow diagram illustrating a method of secure authentication information distribution.

FIG. 3 is a flow diagram illustrating a method of secure authentication information distribution. At step 60, a request for authentication information is received at a computer network from a remote device via a secure connection such as an SSL connection. As described above, the request, a connection request where the secure connection is an SSL connection, includes identity information such as a user name, password, and a digital signature on at least a portion of the identity information. Depending upon how an authentication information store at the computer network is indexed, further information to identify the authentication information being requested may also be provided in the request, and possibly signed.

Using the identity information in the request, an authentication system or server at the computer network determines whether the requested authentication information should be returned to the remote device. If the user is authenticated based on the identity information in the request, as determined at step 62, then the requested authentication information is retrieved and returned to the remote device at step 66.

The returned authentication information is received at the remote device at step 68, and stored in an authentication information store at step 70. Depending on the nature of the returned authentication information, a protected authentication information store may be preferred. For example, where the returned authentication information is an expiring password or access code which is valid for a relatively short period of time, typically on the order of minutes, the authentication information store need not necessarily be a protected store, since it is unlikely that such a password or code would be compromised and used to access the computer network while it remains valid. However, if the returned authentication information has a longer validity period, such as a non-expiring password or a seed from which access codes are generated as required, then the authentication information store is preferably a protected store. In one embodiment, the authentication information store is protected by encrypting the received authentication information using a password or passphrase before storing the authentication information to memory on the remote device. The same password or passphrase is then required to decrypt and use the stored authentication information for remote access to a computer network, as described in further detail below. For example, a user is prompted to enter an authentication information password or passphrase when the authentication information is received from the remote computer network. Depending upon the desired level of security, further information could be used to encrypt the received authentication information along with the password or passphrase to help keep the authentication information more secure. Encrypting the received authentication information using device-specific information such as a serial number in conjunction with a password, for example, ensures that the authentication information from one remote device cannot be used on any other device. In this case, both a password entered by a user and a remote device serial number are either checked before authentication information is decrypted, or required for correct decryption of the authentication information.

Where the user is not authenticated at step 62, then the authentication information request is denied at step 64, and the connection is preferably dropped. An error message may also be returned to inform the entity that submitted the request that the request was denied, and possibly the reason for denial of the request.

With reference back to FIG. 2, authentication information distribution operations on the remote device 30 are preferably handled by a software application or utility that is executed by the processor 50 when a user invokes an authentication information request operation. For example, when authentication information distribution is handled via S-HTTP, SSL, or TLS connection, a browser application on the remote device 30 likely supports authentication information requests and responses. At the LAN 18 in FIG. 1, user authentication for authentication information distribution at step 62 is performed by the data server 26 or the authentication system 27, as described above. When the user has been authenticated, either the authentication system 27 or possibly the data server 26 retrieves the requested authentication information from the authentication information store 29 and the authentication information is returned to the remote device by the data server 26.

In one embodiment of the invention, the authentication information is a password, an access code, or the like that is used in user authentication for remote access to the computer network. When remote access to the computer network is required, this authentication information is retrieved from the authentication information store on the remote device, in accordance with any security measures implemented to protect the authentication information store, and sent to the computer network, along with other authentication information such as a network account password and some form of identifier such as a user name or user account name or number, when remote access to the computer network is required. For example, where remote access to the computer network is Hypertext Transfer Protocol (HTTP) based, then required authentication information and identifiers are formatted in an HTTP connection request. The authentication information retrieved from the authentication information store is either displayed on the remote device and manually entered or copied and pasted by a user for insertion into the connection request, or automatically inserted into the connection request when it is retrieved.

At the computer network, this authentication information is checked against corresponding authentication information stored for the user or user account to determine whether remote access to the computer network should be granted. Where the returned authentication information expires or becomes invalid after a certain period of time, remote access is typically granted when the authentication information is received at the computer network from the remote device before it expires. In some systems, a further time window is provided within which expired authentication information is accepted. This further time window allows for clock differences between the remote device and the computer network and communication network latency, for example.

Figure 4:
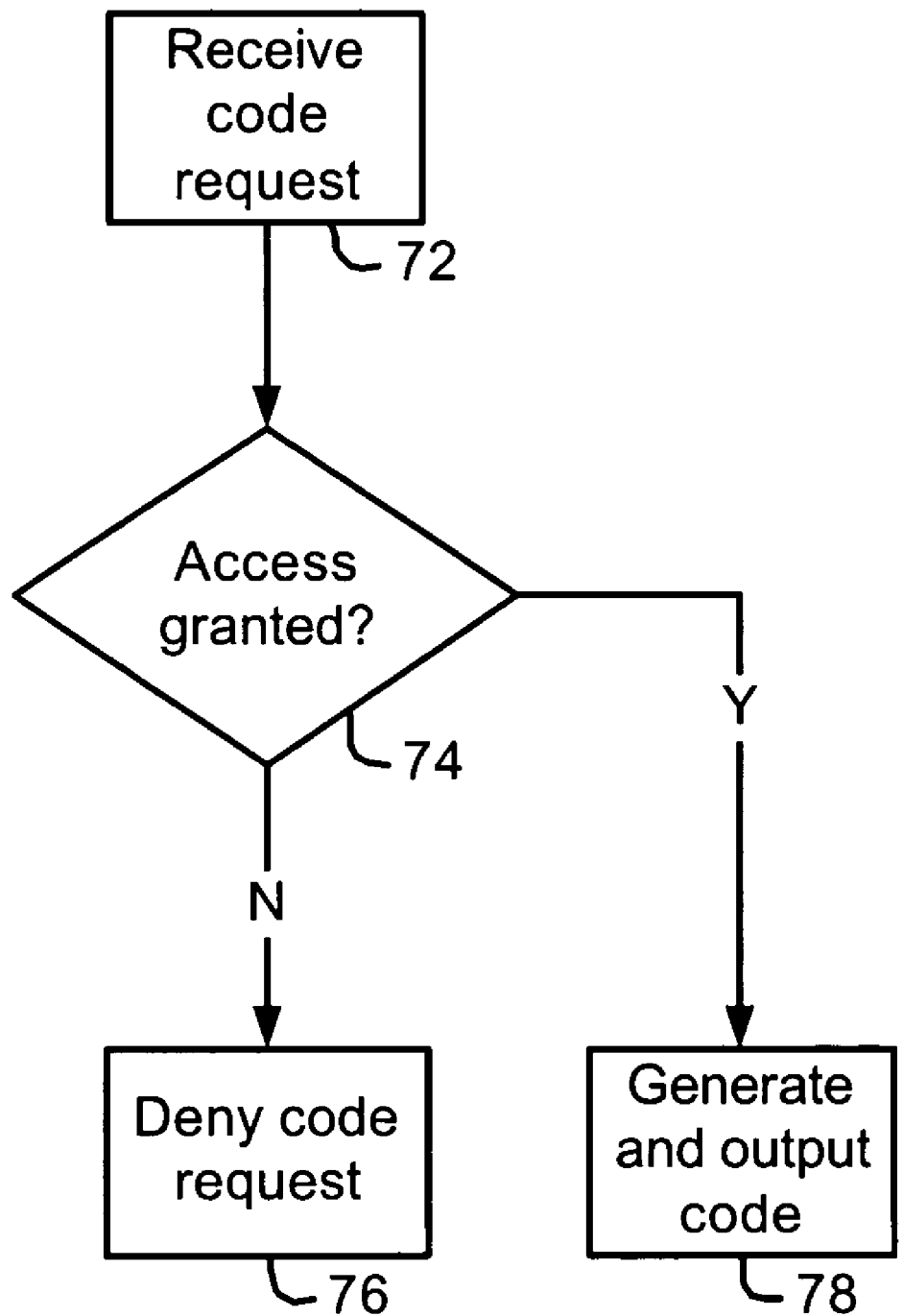
FIG. 4 is a flow diagram illustrating a method of access code generation.

FIG. 4 is a flow diagram illustrating a method of access code generation. In FIG. 4, a request to generate an access code is received at step 72. Although many known access code generators continuously generate and display access codes, in a preferred embodiment, an access code is generated only when needed. For example, a software application such as a browser could be configured to automatically invoke or call the code generation system to generate an access code when a user attempts to remotely access a computer network. The code generation system might also be started when authentication information is received from a computer network, as a user would likely attempt to remotely access the computer network soon after stored authentication information is requested. Alternatively, the user starts the code generation system before or during preparation of a remote access request, using a function call within a software application, for example, or a more generalized function call or menu item not specifically associated with a particular software application. Such "as-needed" access code generation supports a higher level of security for the stored authentication information, as described below, and also conserves power on a remote device since the code generation system does not operate continuously.

In order to access or decrypt stored authentication information (e.g., a seed which has been stored with password-protection), a password must be correctly entered by the user. This provides a further level of security over known code generators which continuously generate access codes. At step 74, it is determined whether access to the authentication information should be granted. Where a password has not been correctly entered, the access code request is denied at step 76. Denial of the code request at step 76 may also involve such typical error processing operations as returning an error message or indication and prompting the user to re-enter the password, for example. The particular operations at step 74 are dependent upon how the authentication information store is protected. Password protection is one possible type of protection, although the present invention is in no way limited thereto.

If access to the authentication information is granted, where the password has been entered correctly, for example, then the method proceeds to step 78. The stored authentication information is accessed, and decrypted if necessary. In one embodiment, a current time is determined from a local clock in the remote device, and an access code is generated using the authentication information, the current time, and an access code generation algorithm. The generated access code is then provided to the user, on a display screen, for example. Those familiar with remote access code generation will appreciate that access codes are typically valid for only a short period of time. As such, a user has a limited time after an access code has been generated to correctly enter the generated access code using a keyboard or keypad, and then complete and send a remote access request. Particularly on remote devices such as mobile telephones and other mobile communication devices on which data entry tends to be somewhat more difficult and time consuming relative to PCs with full alphanumeric keyboards, entry of a generated access code in time to complete and send a remote access request while the generated access code is valid is difficult.

In accordance with another aspect of the invention, the code generation system passes the generated access code to a software application being used for remotely accessing a computer network. The generated access code is then inserted into authentication information to be transmitted to the computer network for user authentication in a remote access operation. For example, in one implementation, the user invokes the code generation system when authentication information such as network user name and network password has been entered, and the generated access code is inserted into the authentication information, typically by appending the access code to the network password. Alternatively, the access code is displayed to the user on a display screen, and can be copied and pasted into the authentication information. Automatic insertion or copy and pasting of generated access codes simplifies user entry of access codes and reduces the likelihood of errors in entering the access codes.

As described above, an authentication system at the computer network fetches the remote device user's authentication information (e.g., seed), and calculates the access code that should have been generated at the remote device to determine whether remote access to the computer network should be granted.

Figure 5:
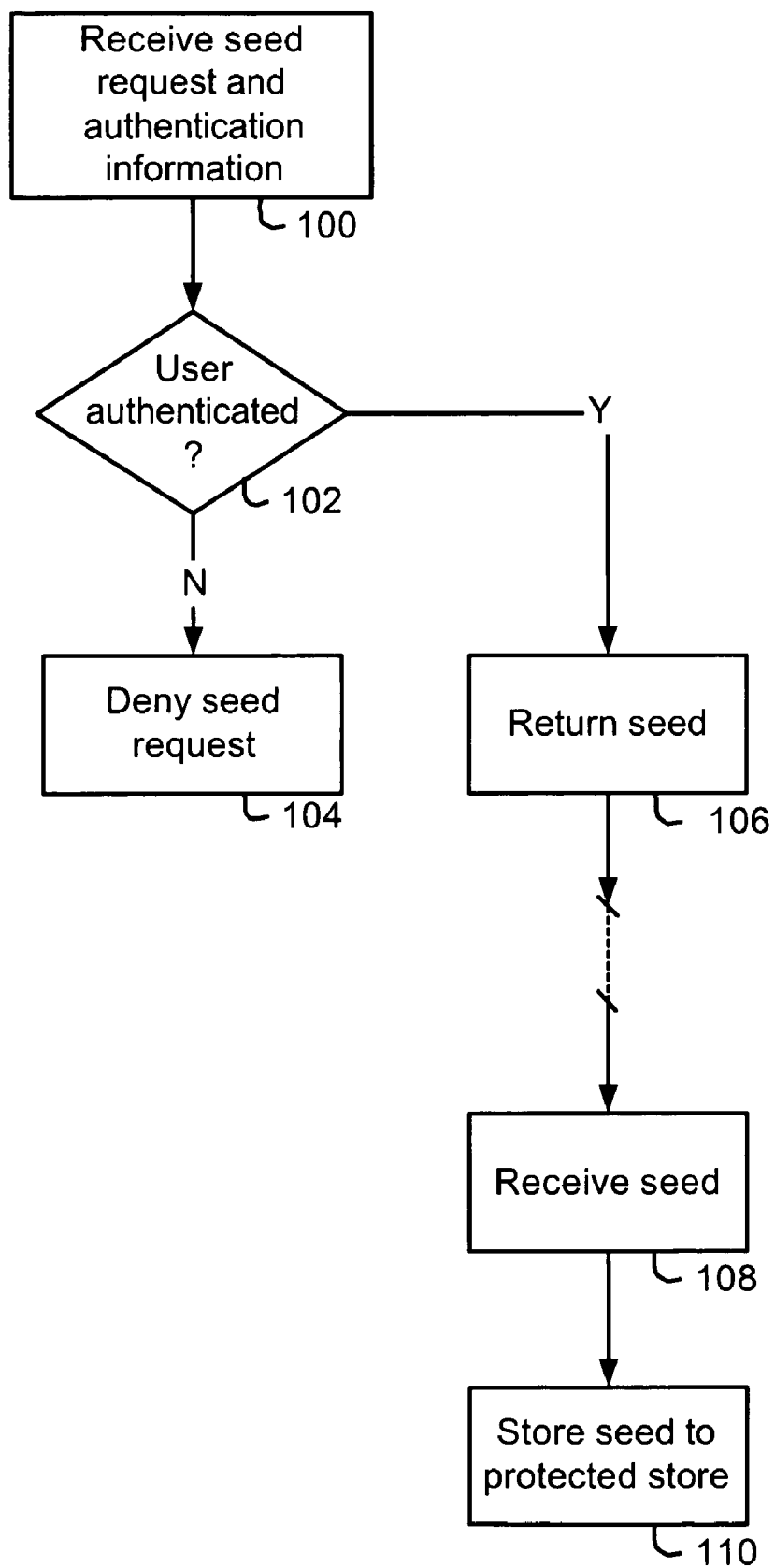
FIG. 5 is a flow diagram illustrating a method of secure seed distribution.

The authorization system may involve different types of access information. For example, FIG. 5 is a flow diagram illustrating a method of secure seed distribution. At step 100, a seed request is received at a computer network from a remote device via a secure connection such as an SSL connection. As described above, the seed request, a connection request where the secure connection is an SSL connection, includes authentication information such as a user name, network password, and an access code generated by an existing code generator. Depending upon how the seed is stored at the computer network, further authentication information, such as a serial number or other identifier of the existing code generator or seed, may also be provided in the seed request. For example, a particular seed may be identified in the seed request by a serial number of the existing code generator.

Using the authentication information in the seed request, an authentication system or secure server associated with the seed store at the computer system determines whether the requested seed should be returned to the remote device. The seed corresponding to the user name and code generator or seed identifier, if required, is retrieved from the seed store at the computer network and used to calculate an access code that should have been generated by the existing code generator. If the user name and password are correct, and the calculated access code matches the access code in the seed request, then the user is authenticated at step 102, and the seed is returned to the remote device at step 106. As those skilled in the art appreciate, a user may be authenticated even though the calculated and received access codes do not match exactly. For example, a user may be authenticated where less than a predetermined amount of time has elapsed since the received access code expired, to allow for latency within communication networks. Many authentication schemes also provide for requesting a further access code from the user in this situation.

The returned seed is received at the remote device at step 108, and stored in a protected seed store at step 110. The seed store on the remote device is preferably protected by encrypting the received seed using a password or passphrase before storing the seed to memory. The same password or passphrase is then required to decrypt and use the stored seed for access code generation, as described in further detail below. In a preferred embodiment, the user is prompted to enter a seed password or passphrase when the seed is retrieved. Depending upon the desired level of security, further information could be used to encrypt the received seed along with the password or passphrase to help keep the seed more secure.

Where the user in not authenticated at step 102, then the seed request is denied at step 104, and the connection is preferably dropped. An error message may also be returned to inform the entity requesting the seed that the request was denied, and possibly the reason for denial of the request.

With reference back to FIG. 2, authentication information distribution operations on the remote device 30 are preferably handled by a software application or utility that is executed by the processor 50 when a user invokes an authentication information request operation. For example, when authentication information distribution is handled via S-HTTP, SSL, or TLS connection, a browser application on the remote device 30 likely supports authentication information requests and responses. At the LAN 18 in FIG. 1, user authentication for authentication information distribution at step 62 is performed by the data server 26 or the authentication system 27, as described above. When the user has been authenticated, either the authentication system 27 or possibly the data server 26 retrieves the requested authentication information from the authentication information store 29 and the authentication information is returned to the remote device by the data server 26.

Figure 6:
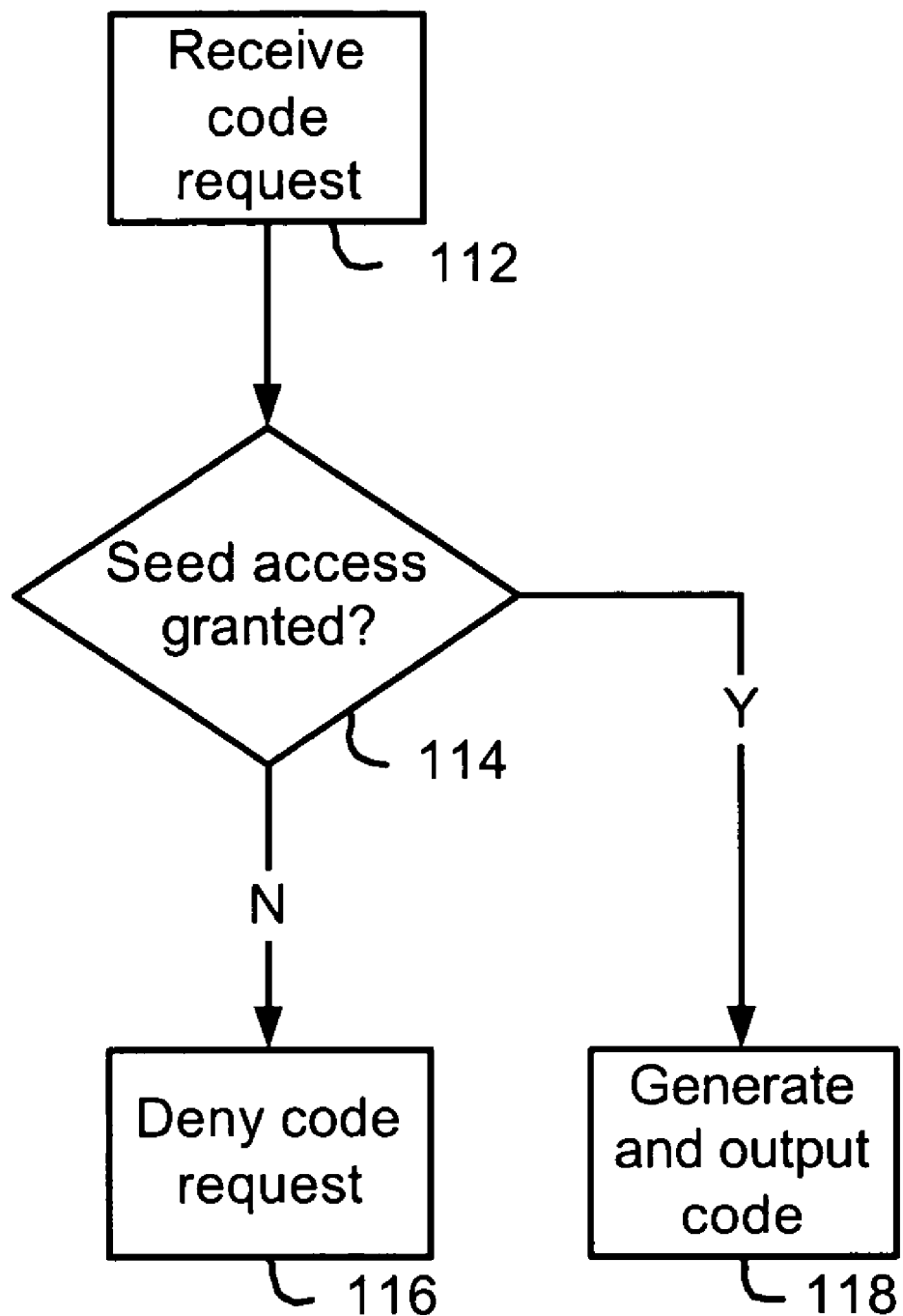
FIG. 6 is a flow diagram illustrating an access code generation method.

In FIG. 6, a request to generate an access code using a seed is received at step 112. Although many known access code generators continuously generate and display access codes, in a preferred embodiment, the code generation system 49 (FIG. 2) optionally generates a code only when needed. For example, a software application such as a browser could be configured to automatically invoke or call the code generation system 49 to generate an access code when a user attempts to remotely access a computer network. Alternatively, the user starts the code generation system 49 before or during preparation of a remote access request, using a function call within a software application, for example, or a more generalized function call or menu item not specifically associated with a particular software application. Such "as-needed" access code generation supports a higher level of security for the stored seed and also conserves power on the mobile device 30 since the code generation system 49 does not operate continuously.

In order to access or decrypt a stored seed, depending upon how the seed store is protected, a password must be correctly entered by the user. This provides a further level of security over known code generators which continuously generate access codes. At step 114, it is determined whether access to the seed should be granted. Where a password has not been correctly entered, the access code request is denied at step 116. Denial of the code request at step 116 may also involve such typical error processing operations as returning an error message or indication and prompting the user to re-enter the password, for example.

If the password has been entered correctly, as determined at step 114, then the method proceeds to step 118. The stored seed is accessed, and decrypted if necessary. In one embodiment, a current time is also determined, from the clock 53 in FIG. 2, and an access code is generated using the seed, the current time, and an access code generation algorithm. The generated access code is then provided to the user, on a display screen, for example.

As described above, an authentication system at the computer network fetches the remote device user's seed, and calculates the access code that should have been generated at the remote device to determine whether remote access to the computer network should be granted.

Figure 7:
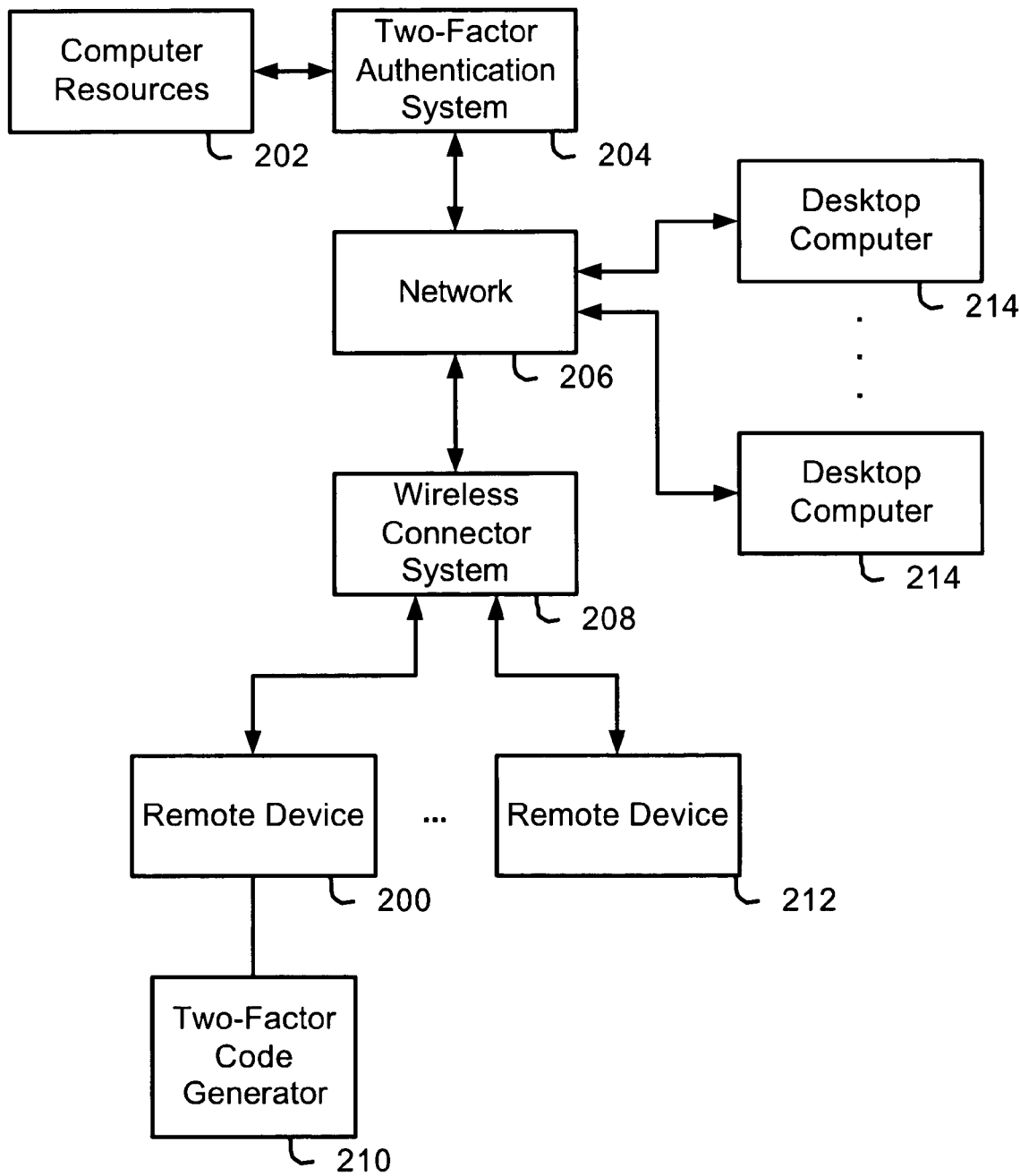
FIG. 7 is a block diagram of a wireless system enabled for secure seed distribution and access code generation.

Having described in detail several preferred embodiments of the present invention, including the preferred methods of operation, it is to be understood that this operation could be carried out with different elements and steps. The above preferred embodiments are presented only by way of example and are not meant to limit the scope of the invention described herein. An example of the wide scope of the invention is illustrated with FIG. 7. With reference to FIG. 7, a remote device 200 requires authentication information in order to access computer resources 202. The remote device 200 obtains the desired authentication information from an authentication system 204 which in this example uses a two-factor authentication technique when determining whether to grant access to the computer resources 202.

The remote device 200 provides a request to the authentication system 204 over a wireless connector system 208 (e.g., a wireless network gateway and/or a wireless network) which is then sent over a network 206 to the two-factor authentication system 204. The request includes identity information for use by the authentication system 204 to authenticate the remote device 200 based on the identity information provided in the request.

The authentication system 204 checks whether there is authorization to provide authentication information to the remote device 200. The authentication system 204 uses the supplied identity information to make the authorization check. If the authorization check succeeds, then the authentication system 204 provides the authentication information to the remote device 200. When the remote device 200 is to access the computer resources 202, the remote device's two-factor code generator 210 generates based upon the authentication information the access data that is needed to gain access to the computer resources 202.

Multiple remote devices 212 and computer systems 214 (e.g., desktop computers, laptops, etc.) may also use this approach to access the computer resources through the two-factor authentication technique. Such an approach offers an alternative to known access code generators. For example, where authentication information must be requested and then used for remotely accessing a computer network, an audit trail may be provided for remote access operations. Also, if the authentication information is dynamic and thus valid only for a certain period of time, then a user does not have required authentication information until it is needed, reducing the likelihood that valid authentication information can be lost or given away by a user. Using authentication information distribution provides that static passwords can be rotated between users and provided to users when requested. Generation of access codes based on a current time, synchronization between a local and remote clocks, and checking received access codes against past and future access codes at an authentication system are thereby avoided.

Distribution of authentication information according to aspects of the present invention may be implemented in conjunction with or instead of access code generator-based two-factor authentication for remote access to a computer network. Where access code generators are used, the user has possession of a specific code generator, and provide the access code currently displayed on the code generator when remote access to the LAN 18 (FIG. 1) is requested. Otherwise, remote access to the LAN 18 requires intervention by a network administrator or owner, who "manually" authenticates the user before granting remote access to the LAN 18 without the normal two-factor authentication. A software-based code generator installed on a remote device from which remote access is enabled alleviates misplaced hardware-based code generators, and allows secure seed distribution. Systems and methods of secure authentication information distribution disclosed herein reduce network administrator involvement and user inconvenience associated with known authentication schemes. For example, distribution of authentication information alleviates remote network access problems when a required code generator is not available.

As yet another example of the wide applicability of the methods and systems disclosed herein, where different computer systems or components at a computer network handle user authentication for authentication information distribution and remote access operations, each such system or component may have an associated authentication information store. With reference to FIG. 1, where the data server 26 authenticates a user when a request for stored authentication information is received, the data server 26 may consult a further authentication information store (not shown) to check the authentication information in the request.

In addition, authentication information distribution as described herein is also applicable to different types of communication systems than the system 10 of FIG. 1. Although the LAN 18 is remotely accessed via the WAN 12 in FIG. 1, a computer network could also or instead be accessible through one or more other types of networks, including other LANs, Wireless LANs (WLANs), Metropolitan Area Networks (MANs), and Neighbourhood Area Networks (NANs), for example.

Authentication information used for user authentication during remote access to a computer network differs from the identity information submitted in a request for authentication information. It should be appreciated that identity information and authentication information could include some common information. For example, a password included in identity information in a request could be the same as a network password used as one factor for user authentication in a subsequent remote access operation. In this case, a second authentication factor in the request might be a digital signature or a remote device serial number, whereas a second authentication factor for remote access includes authentication information returned in response to the request, or information generated from the returned authentication information. Thus, the identity information and authentication information include different information, but may also include some common authentication information.

Where an authentication information store is protected, a scheme such as shown in FIG. 4 is generally preferred in that communication traffic is avoided when access to the authentication information is denied. Alternatively, when the authentication information is protected via password-based encryption, for example, the authentication information is properly decrypted only when the password is entered correctly. Thus, the password need not be explicitly checked as shown in FIG. 4. The authentication information could be retrieved and decrypted using the password as entered, and sent to the computer network. If the password had not been entered correctly, then the authentication information is not properly decrypted, user authentication at the computer network fails, and remote access to the computer network is denied.

As described above, identity information in a request for authentication information preferably includes something that a user knows, such as a password, and something a user has, indicated by a verified digital signature, for example. Where user and remote device associations are available to computer network, then an identifier of the remote device may be used as an authentication factor. Other implementations may similarly enable user or remote device information stored at the computer network to be exploited during an authentication information distribution operation. For example, in one known implementation which provides for communications between a computer network such as the LAN 18 (FIG. 1) and the mobile device 22, the data server 26 incorporates or operates in conjunction with a wireless connector system (not shown) which communicates with the mobile device 22 through the wireless network gateway 16. A mobile device 22 and user are enabled for communication with the LAN 18 by establishing a user information record including a user or user account identifier and a mobile device identifier at the wireless connector system, and storing a symmetric cryptographic key at both the wireless connector system and the mobile device 22. The symmetric key supports secure communications between the LAN 18 and the mobile device 22. Information to be sent to the mobile device 22 is encrypted by the wireless connector system and decrypted when received at the mobile device 22, and vice versa. In this system, where a request for authentication information is encrypted at a remote device and then sent to the LAN 18, proper decryption of the encrypted request at the LAN 18 indicates that the user submitting the request has the symmetric key. As such, encryption of the request can serve as an authentication factor during authentication information distribution. Public/private encryption key pairs could similarly be used.

The disclosed systems and methods are not dependent upon any particular type of authentication information to be distributed. Authentication information could be static or dynamic, specific to a particular user or shared between multiple users, and might be sent back to the computer network when remote access is required, or used to generate further authentication information that is sent to the computer network to remotely access the network, as in the case of a seed. The extent of remote access that is granted based on the authentication information may also be different than described above. The authentication information might grant access to all network resources or one or more particular network resources. Remote access could be further limited to a predetermined maximum period of time. In this case, a remote access session established on the basis of authentication information returned in response to a request can be maintained only for the maximum period of time, after which new authentication information must be requested to establish a new remote access session. Time- and resource-limited remote access provide for enhanced security, in that an unauthorized user that obtains authentication information cannot obtain full, unlimited access to a computer system.

Another optional security enhancement applicable to the systems and methods described above involves insertion of a time reference or sequence number in each request for authentication information. Even though authentication information is returned to a requester over a secure channel to prevent an attacker from obtaining the authentication information, it may be desirable to provide for detection of a replay attack, in which a previous request is replayed to the computer network by an attacker. Where each request includes a sequence number or time reference, the computer network can determine whether a request is a replay of an old request, and take appropriate action to ignore the request and to identify the attacker, for example.

Figure 8:
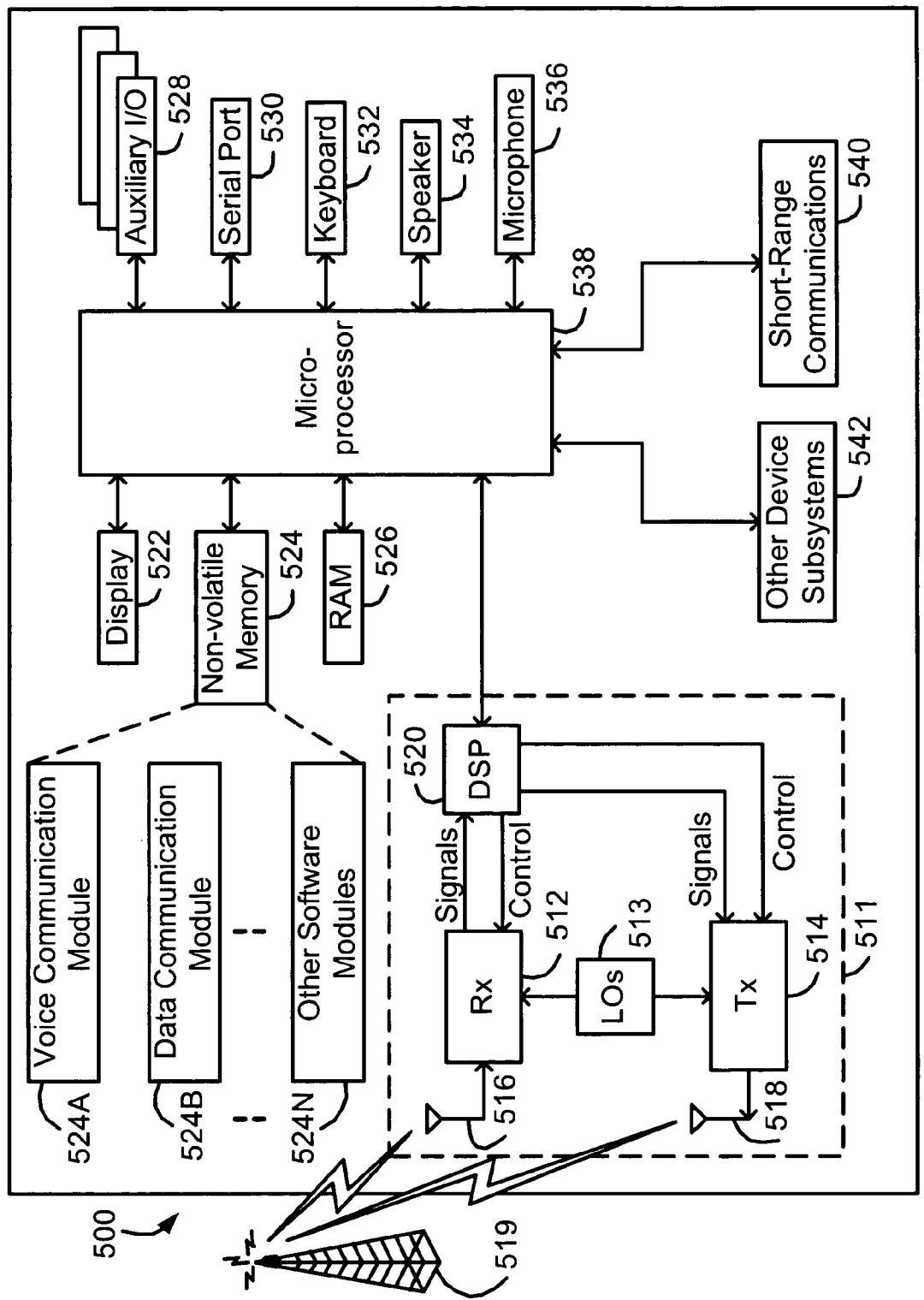
FIG. 8 is a block diagram of a wireless mobile communication device.

The systems and methods disclosed herein may be used with many different devices, such as the device shown in FIG. 8. FIG. 8 depicts a wireless mobile communication device. The mobile device 500 is preferably a two-way communication device having at least voice and data communication capabilities. The mobile device 500 preferably has the capability to communicate with other computer systems on the Internet. Depending on the functionality provided by the mobile device 500, it may be referred to as a data messaging device, a two-way pager, a mobile telephone with data messaging capabilities, a wireless Internet appliance, or a data communication device (with or without telephony capabilities), but is referred to herein primarily as a mobile device.

The mobile device 500 includes a transceiver 511, a microprocessor 538, a display 522, non-volatile memory 524, random access memory (RAM) 526, auxiliary input/output (I/O) devices 528, a serial port 530, a keyboard 532, a speaker 534, a microphone 536, a short-range wireless communications sub-system 540, and other device sub-systems 542. The transceiver 511 preferably includes transmit and receive antennas 516, 518, a receiver (Rx) 512, a transmitter (Tx) 514, one or more local oscillators (LOs) 513, and a digital signal processor (DSP) 520. Within the non-volatile memory 524, the mobile device 500 includes a plurality of software modules 524A-524N that can be executed by the microprocessor 538 (and/or the DSP 520), including a voice communication module 524A, a data communication module 524B, and a plurality of other operational modules 524N for carrying out a plurality of other functions.

The mobile device 500 is preferably a two-way communication device having voice and data communication capabilities. Thus, for example, the mobile device 500 may communicate over a voice network, such as any of the analog or digital cellular networks, and may also communicate over a data network. The voice and data networks are depicted in FIG. 8 by the communication tower 519. These voice and data networks may be separate communication networks using separate infrastructure, such as base stations, network controllers, etc., or they may be integrated into a single wireless network. References to the network 519 should therefore be interpreted as encompassing both a single voice and data network and separate networks.

The communication subsystem 511 is used to communicate with the network 519. The DSP 520 is used to send and receive communication signals to and from the transmitter 514 and receiver 512, and also exchange control information with the transmitter 514 and receiver 512. If the voice and data communications occur at a single frequency, or closely-spaced set of frequencies, then a single LO 513 may be used in conjunction with the transmitter 514 and receiver 512. Alternatively, if different frequencies are utilized for voice communications versus data communications or the mobile device 500 is enabled for communications on more than one network 519, then a plurality of LOs 513 can be used to generate frequencies corresponding to those used in the network 519. Although two antennas 516, 518 are depicted in FIG. 8, the mobile device 500 could be used with a single antenna structure. Information, which includes both voice and data information, is communicated to and from the communication module 511 via a link between the DSP 520 and the microprocessor 538.

The detailed design of the communication subsystem 511, such as frequency band, component selection, power level, etc., is dependent upon the communication network 519 in which the mobile device 500 is intended to operate. For example, a mobile device 500 intended to operate in a North American market may include a communication subsystem 511 designed to operate with the Mobitex or DataTAC mobile data communication networks and also designed to operate with any of a variety of voice communication networks, such as Advanced Mobile Phone System (AMPS), TDMA, CDMA, PCS, etc., whereas a mobile device 500 intended for use in Europe may be configured to operate with the GPRS data communication network and the GSM voice communication network. Other types of data and voice networks, both separate and integrated, may also be utilized with the mobile device 500.

Communication network access requirements for the mobile device 500 also vary depending upon the type of network 519. For example, in the Mobitex and DataTAC data networks, mobile devices are registered on the network using a unique identification number associated with each device. In GPRS data networks, however, network access is associated with a subscriber or user of the mobile device 500. A GPRS device typically requires a subscriber identity module ("SIM"), which is required in order to operate the mobile device 500 on a GPRS network. Local or non-network communication functions (if any) may be operable, without the SIM, but the mobile device 500 is unable to carry out functions involving communications over the network 519, other than any legally required operations, such as '911' emergency calling.

After any required network registration or activation procedures have been completed, the mobile device 500 is able to send and receive communication signals, preferably including both voice and data signals, over the network 519. Signals received by the antenna 516 from the communication network 519 are routed to the receiver 512, which provides for signal amplification, frequency down conversion, filtering, channel selection, etc., and analog to digital conversion. Analog to digital conversion of the received signal allows more complex communication functions, such as digital demodulation and decoding, to be performed using the DSP 520. In a similar manner, signals to be transmitted to the network 519 are processed, including modulation and encoding, for example, by the DSP 520 and are then provided to the transmitter 514 for digital to analog conversion, frequency up conversion, filtering, amplification and transmission to the communication network 519 via the antenna 518. Although a single transceiver 511 is shown for both voice and data communications, in alternative embodiments, the mobile device 500 may include multiple distinct transceivers, such as a first transceiver for transmitting and receiving voice signals, and a second transceiver for transmitting and receiving data signals, or a first transceiver configured to operate within a first frequency band, and a second transceiver configured to operate within a second frequency band.

In addition to processing the communication signals, the DSP 520 also provides for receiver and transmitter control. For example, the gain levels applied to communication signals in the receiver 512 and transmitter 514 may be adaptively controlled through automatic gain control algorithms implemented in the DSP 520. Other transceiver control algorithms could also be implemented in the DSP 520 in order to provide more sophisticated control of the transceiver 511.

The microprocessor 538 preferably manages and controls the overall operation of the mobile device 500. Many types of microprocessors or microcontrollers could be used here, or, alternatively, a single DSP 520 could be used to carry out the functions of the microprocessor 538. Low-level communication functions, including at least data and voice communications, are performed through the DSP 520 in the transceiver 511. High-level communication applications, including the voice communication application 524A, and the data communication application 524B are stored in the non-volatile memory 524 for execution by the microprocessor 538. For example, the voice communication module 524A provides a high-level user interface operable to transmit and receive voice calls between the mobile device 500 and a plurality of other voice devices via the network 519. Similarly, the data communication module 524B provides a high-level user interface operable for sending and receiving data, such as e-mail messages, files, organizer information, short text messages, etc., between the mobile device 500 and a plurality of other data devices via the network 519.

The microprocessor 538 also interacts with other device subsystems, such as the display 522, the RAM 526, the auxiliary I/O devices 528, the serial port 530, the keyboard 532, the speaker 534, the microphone 536, the short-range communications subsystem 540, and any other device subsystems generally designated as 542. For example, the modules 524A-N are executed by the microprocessor 538 and may provide a high-level interface between a user of the mobile device and the mobile device. This interface typically includes a graphical component provided through the display 522, and an input/output component provided through the auxiliary I/O devices 528, keyboard 532, speaker 534, or microphone 536.

Some of the subsystems shown in FIG. 8 perform communication-related functions, whereas other subsystems may provide "resident" or on-device functions. Notably, some subsystems, such as keyboard 532 and display 522 may be used for both communication-related functions, such as entering a text message for transmission over a data communication network, and device-resident functions such as a calculator or task list or other PDA type functions.

Operating system software used by the microprocessor 538 is preferably stored in a persistent store such as the non-volatile memory 524. In addition to the operating system and communication modules 524A-N, the non-volatile memory 524 may include a file system for storing data. The non-volatile memory 524 also includes at least an authentication information store for storing authentication information. The operating system, specific device applications or modules, or parts thereof, are typically temporarily loaded into a volatile store, such as the RAM 526 for faster operation. Moreover, received communication signals may also be temporarily stored to RAM 526, before permanently writing them to a file system located in the non-volatile memory 524. The non-volatile memory 524 may be implemented, for example, with Flash memory, non-volatile RAM, or battery backed-up RAM.

An exemplary application module 524N that may be loaded onto the mobile device 500 is a personal information manager (PIM) application providing PDA functionality, such as calendar events, appointments, and task items. This module 524N may also interact with the voice communication module 524A for managing phone calls, voice mails, etc., and may also interact with the data communication module 524B for managing e-mail communications and other data transmissions. Alternatively, all of the functionality of the voice communication module 524A and the data communication module 524B may be integrated into the PIM module.

The non-volatile memory 524 preferably provides a file system to facilitate storage of PIM data items on the device. The PIM application preferably includes the ability to send and receive data items, either by itself, or in conjunction with the voice and data communication modules 524A, 524B, via the wireless network 519. The PIM data items are preferably seamlessly integrated, synchronized and updated, via the wireless network 519, with a corresponding set of data items stored or associated with a host computer system, thereby creating a mirrored system for data items associated with a particular user.

The mobile device 500 is manually synchronized with a host system by placing the mobile device 500 in an interface cradle, which couples the serial port 530 of the mobile device 500 to a serial port of the host system. The serial port 530 may also be used to download other application modules 524N for installation on the mobile device 500. This wired download path may further be used to load encryption keys onto the mobile device 500 for use in secure communications, which is a more secure method than exchanging encryption information via the wireless network 519.

Software application modules 524N may be loaded onto the mobile device 500 through the network 519, through an auxiliary I/O subsystem 528, through the short-range communications subsystem 540, or through any other suitable subsystem 542, and installed by a user in the non-volatile memory 524 or RAM 526. Such flexibility in application installation increases the functionality of the mobile device 500 and may provide enhanced on-device functions, communication-related functions, or both. For example, secure communication applications may enable electronic commerce functions and other such financial transactions to be performed using the mobile device 500. The code generation system, if the authentication information distributed as described above includes a seed, is preferably implemented as a software module 524N in the non-volatile memory 524. Such software applications as a browser or a messaging application in the non-volatile memory 524 support remote access to a computer network using distributed authentication information and two-factor authentication at the computer network. The code generation software module or utility could be incorporated into, or at least accessible from, each remote access software application to provide for the access code insertion or copy and paste features described above.

When the mobile device 500 is operating in a data communication mode, a received signal, such as a text message or a web page download, is processed by the transceiver 511 and provided to the microprocessor 538, which preferably further processes the received signal for output to the display 522, or, alternatively, to an auxiliary I/O device 528. When data protection is enabled, received data may be encrypted as described above before being stored on the mobile device 500. A user of mobile device 500 may also compose data items, such as email messages, using the keyboard 532, which is preferably a complete alphanumeric keyboard laid out in the QWERTY style, although other styles of complete alphanumeric keyboards such as the known DVORAK style may also be used. User input to the mobile device 500 is further enhanced with the plurality of auxiliary I/O devices 528, which may include a thumbwheel input device, a touchpad, a variety of switches, a rocker input switch, etc. The composed data items input by the user are then transmitted over the communication network 519 via the transceiver 511, and may also be stored in encrypted form on the mobile device 500.

When the mobile device 500 is operating in a voice communication mode, the overall operation of the mobile device 500 is substantially similar to the data mode, except that received signals are output to the speaker 534 and voice signals for transmission are generated by a microphone 536. Alternative voice or audio I/O devices, such as a voice message recording subsystem, may also be implemented on the mobile device 500. The display 522 may also be used to provide an indication of the identity of a calling party, the duration of a voice call, or other voice call related information. For example, the microprocessor 538, in conjunction with the voice communication module 524A and the operating system software, may detect the caller identification information of an incoming voice call and display it on the display 522.

A short-range communications subsystem 540 is also included in the mobile device 500. For example, the subsystem 540 may include an infrared device and associated circuits and components, or a BLUETOOTH® or 802.11 short-range wireless communication module to provide for communication with similarly-enabled systems and devices.

It will be appreciated that the above description relates to preferred embodiments by way of example only. Many variations on the systems and methods described above will be obvious to those knowledgeable in the field, and such obvious variations are within the scope of the invention as described, whether or not expressly described.

For example, a device in which systems and methods described above is implemented may include fewer, further, or different components than those shown in the drawings.

In addition, seed distribution as described herein is also applicable to different types of communication systems than the system 10 of FIG. 1. Although the LAN 18 is remotely accessed via the WAN 12 in FIG. 1, a computer network could also or instead be accessed remotely through one or more other types of networks, including other LANs, Wireless LANs (WLANs), Metropolitan Area Networks (MANs), and National Area Networks (NANs), for example.

Figure 9:
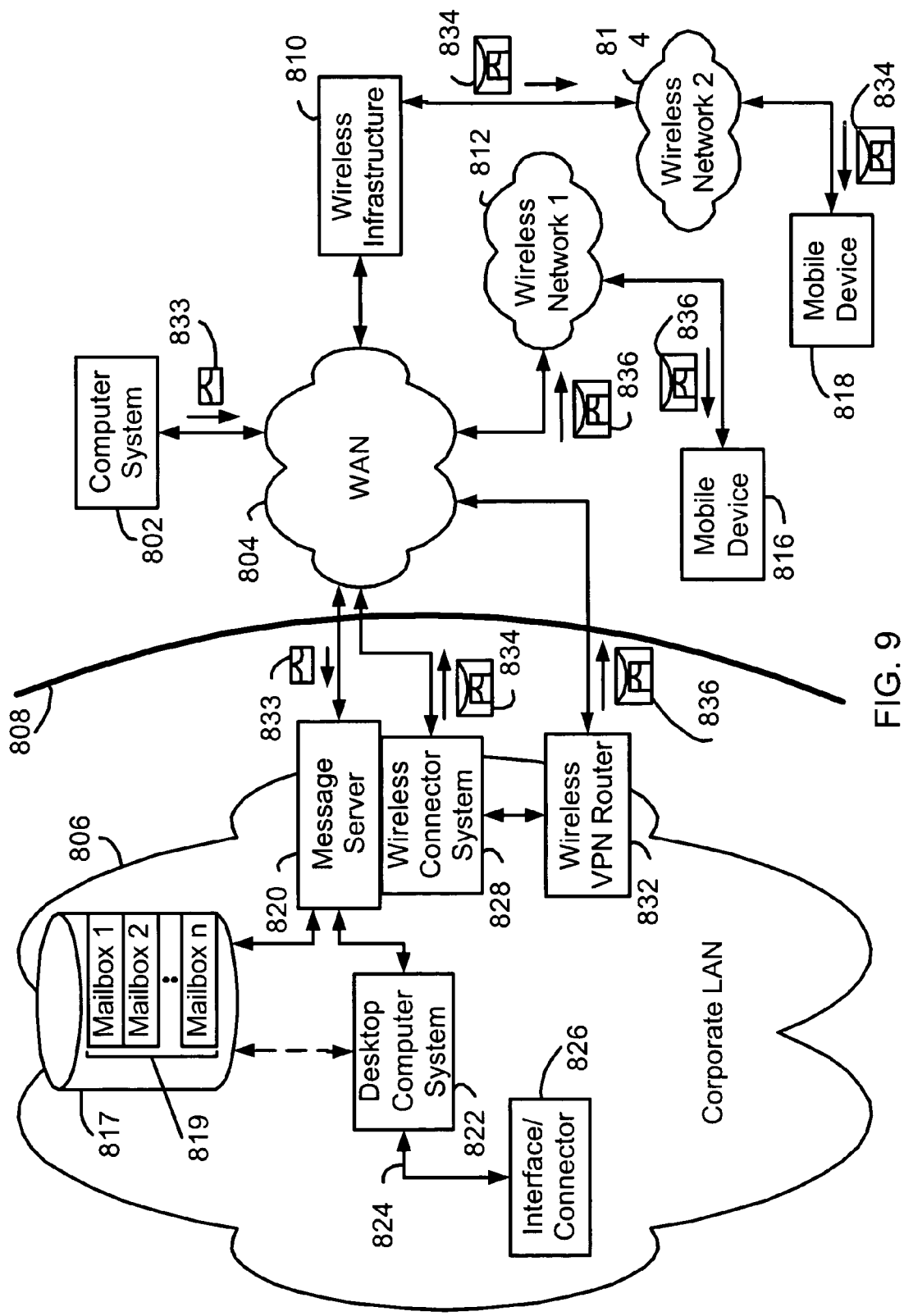
FIG. 9 is a block diagram showing an example communication system.
Figure 10:
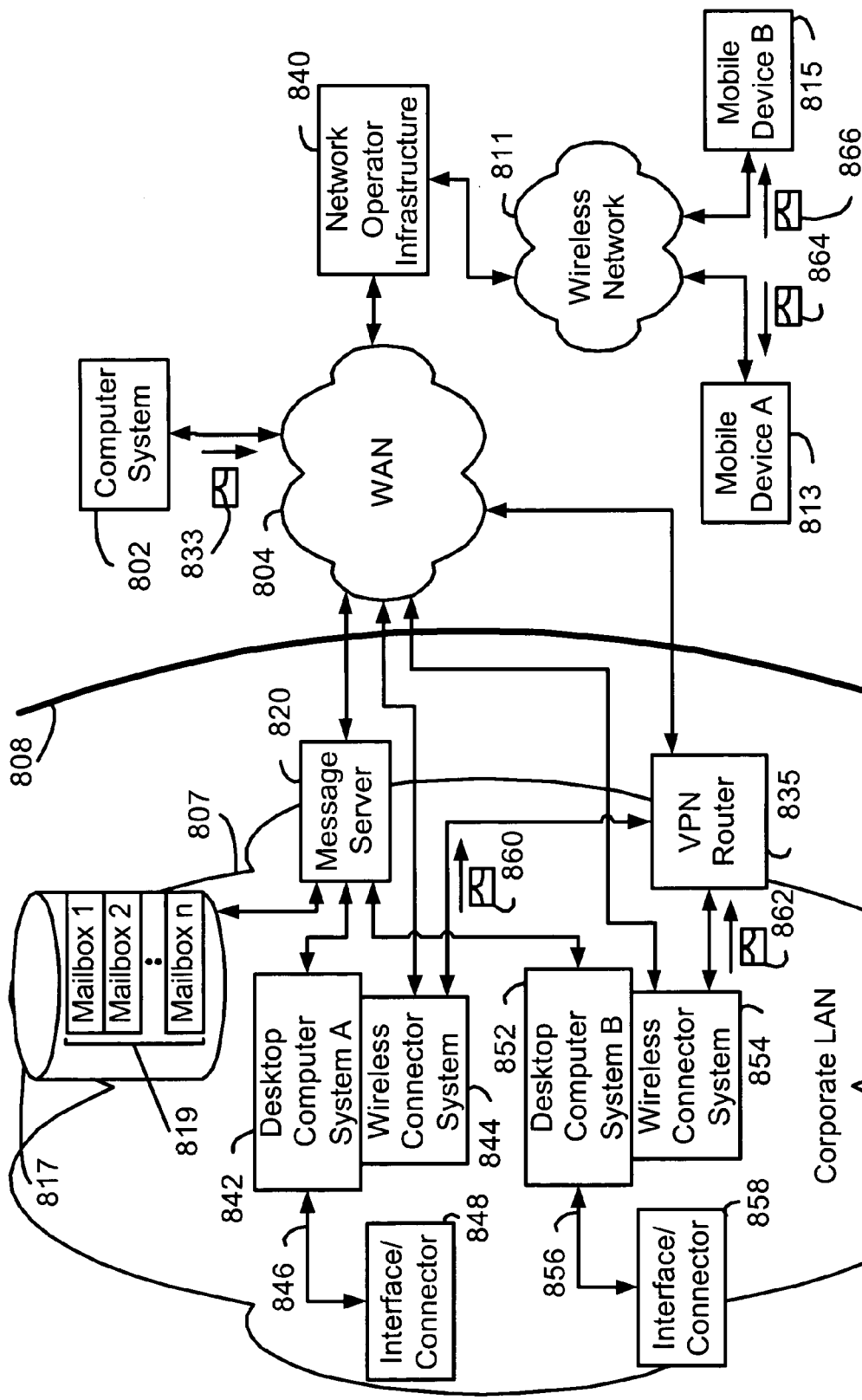
FIG. 10 is a block diagram of an alternative example communication system.
Figure 11:
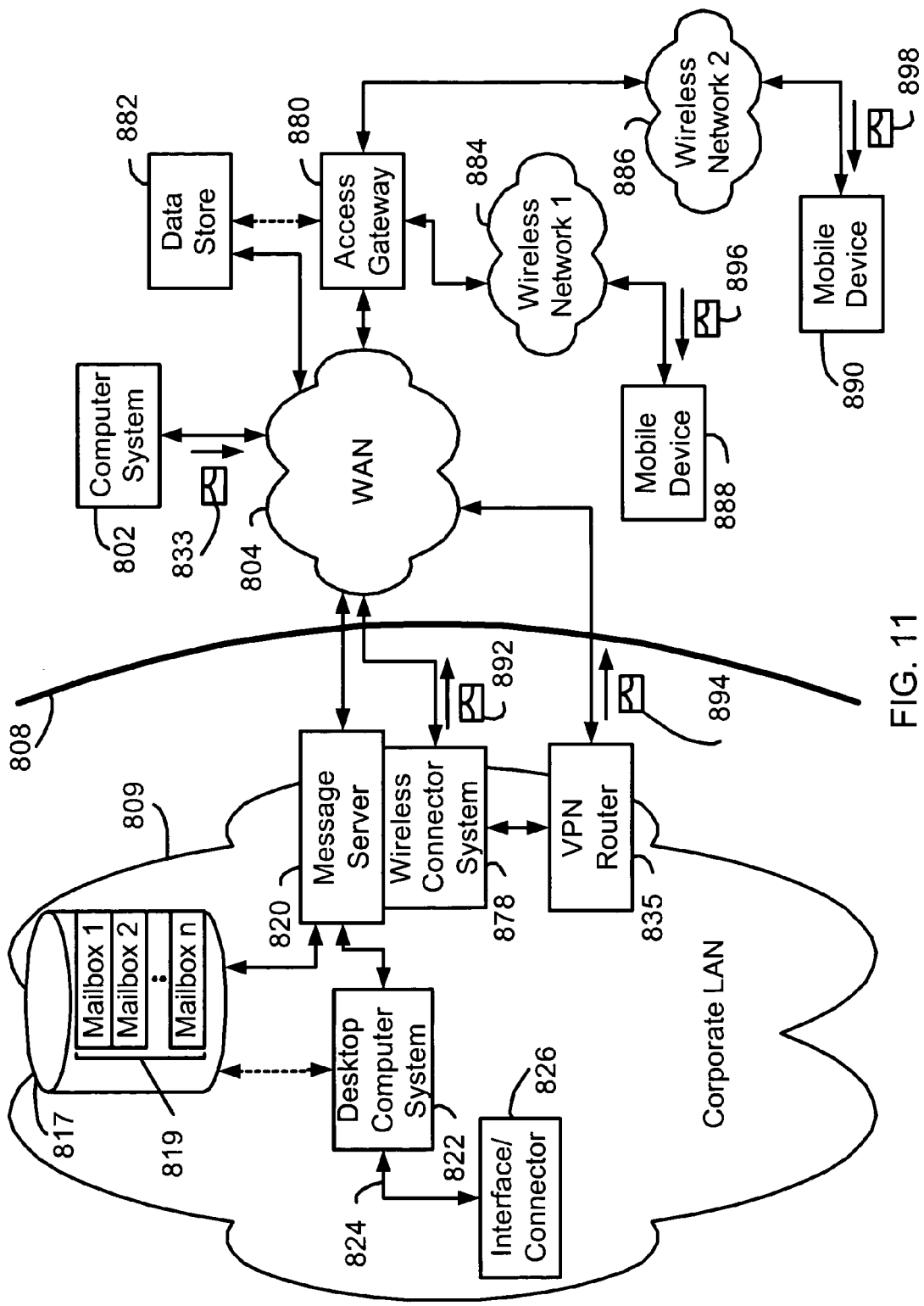
FIG. 11 is a block diagram of another alternative communication system.

Still further examples of the wide scope of the systems and methods disclosed herein are illustrated in FIGS. 9-11. FIGS. 9-11 describe additional uses of the systems and methods within different exemplary communication systems. FIG. 9 is a block diagram showing an example communication system. In FIG. 9, there is shown a computer system 802, a WAN 804, corporate LAN 806 behind a security firewall 808, wireless infrastructure 810, wireless networks 812 and 814, and mobile devices 816 and 818. The corporate LAN 806 includes a message server 820, a wireless connector system 828, a data store 817 including at least a plurality of mailboxes 819, a desktop computer system 822 having a communication link directly to a mobile device such as through physical connection 824 to an interface or connector 826, and a wireless VPN router 832. Operation of the system in FIG. 9 will be described below with reference to the messages 833, 834 and 836.

The computer system 802 may, for example, be a laptop, desktop or palmtop computer system configured for connection to the WAN 804. Such a computer system may connect to the WAN 804 via an ISP or ASP. Alternatively, the computer system 802 may be a network-connected computer system that, like the computer system 822, accesses the WAN 804 through a LAN or other network. Many modern mobile devices are enabled for connection to a WAN through various infrastructure and gateway arrangements, so that the computer system 802 may also be a mobile device.

The corporate LAN 806 is an illustrative example of a central, server-based messaging system that has been enabled for wireless communications. The corporate LAN 806 may be referred to as a "host system", in that it hosts both a data store 817 with mailboxes 819 for messages, as well as possibly further data stores (not shown) for other data items, that may be sent to or received from mobile devices 816 and 818, and the wireless connector system 828, the wireless VPN router 832, or possibly other components enabling communications between the corporate LAN 806 and one or more mobile devices 816 and 818. In more general terms, a host system may be one or more computers at, with or in association with which a wireless connector system is operating. The corporate LAN 806 is one preferred embodiment of a host system, in which the host system is a server computer running within a corporate network environment operating behind and protected by at least one security firewall 808. Other possible central host systems include ISP, ASP and other service provider or mail systems. Although the desktop computer system 824 and interface/connector 826 may be located outside such host systems, wireless communication operations may be similar to those described below.

The corporate LAN 806 implements the wireless connector system 828 as an associated wireless communications enabling component, which is normally a software program, a software application, or a software component built to work with at least one or more message server. The wireless connector system 828 is used to send user-selected information to, and to receive information from, one or more mobile devices 816 and 818, via one or more wireless networks 812 and 814. The wireless connector system 828 may be a separate component of a messaging system, as shown in FIG. 9, or may instead be partially or entirely incorporated into other communication system components. For example, the message server 820 may incorporate a software program, application, or component implementing the wireless connector system 828, portions thereof, or some or all of its functionality.

The message server 820, running on a computer behind the firewall 808, acts as the main interface for the corporation to exchange messages, including for example electronic mail, calendaring data, voice mail, electronic documents, and other PIM data with the WAN 804, which will typically be the Internet. The particular intermediate operations and computers are dependent upon the specific type of message delivery mechanisms and networks via which messages are exchanged, and therefore have not been shown in FIG. 9. The functionality of the message server 820 may extend beyond message sending and receiving, providing such features as dynamic database storage for data like calendars, to do lists, task lists, e-mail and documentation, as described above.

Message servers such as 820 normally maintain a plurality of mailboxes 819 in one or more data stores such as 817 for each user having an account on the server. The data store 817 includes mailboxes 819 for a number of ("n") user accounts. Messages received by the message server 820 that identify a user, a user account, a mailbox, or possibly another address associated with a user, account or mailbox 819 as a message recipient are stored in the corresponding mailbox 819. If a message is addressed to multiple recipients or a distribution list, then copies of the same message are typically stored to more than one mailbox 819. Alternatively, the message server 820 may store a single copy of such a message in a data store accessible to all of the users having an account on the message server, and store a pointer or other identifier in each recipient's mailbox 819. In typical messaging systems, each user accesses his or her mailbox 819 and its contents using a messaging client such as MICROSOFT OUTLOOK® software or LOTUS NOTES® software, which normally operates on a PC, such as the desktop computer system 822, connected in the LAN 806. Although only one desktop computer system 822 is shown in FIG. 9, those skilled in the art will appreciate that a LAN will typically contain many desktop, notebook and laptop computer systems. Each messaging client normally accesses a mailbox 819 through the message server 820, although in some systems, a messaging client may enable direct access to the data store 817 and a mailbox 819 stored thereon by the desktop computer system 822. Messages may also be downloaded from the data store 817 to a local data store (not shown) on the desktop computer system 822.

Within the corporate LAN 806, the wireless connector system 828 operates in conjunction with the message server 820. The wireless connector system 828 may reside on the same computer system as the message server 820, or may instead be implemented on a different computer system. Software implementing the wireless connector system 828 may also be partially or entirely integrated with the message server 820. The wireless connector system 828 and the message server 820 are preferably designed to co-operate and interact to allow the pushing of information to mobile devices 816, 818. In such an installation, the wireless connector system 828 is preferably configured to send information that is stored in one or more data stores associated with the corporate LAN 806 to one or more mobile devices 816, 818, through the corporate firewall 808 and via the WAN 804 and one of the wireless networks 812, 814. For example, a user that has an account and associated mailbox 819 in the data store 817 may also have a mobile device, such as 816. As described above, messages received by the message server 820 that identify a user, account or mailbox 819 are stored to a corresponding mailbox 819 by the message server 820. If a user has a mobile device, such as 816, messages received by the message server 820 and stored to the user's mailbox 819 are preferably detected by the wireless connector system 828 and sent to the user's mobile device 816. This type of functionality represents a "push" message sending technique. The wireless connector system 828 may instead employ a "pull" technique, in which items stored in a mailbox 819 are sent to a mobile device 816, 818 responsive to a request or access operation made using the mobile device, or some combination of both techniques.

The use of a wireless connector 828 thereby enables a messaging system including a message server 820 to be extended so that each user's mobile device 816, 818 has access to stored messages of the message server 820. Although the systems and methods described herein are not restricted solely to a push-based technique, a more detailed description of push-based messaging may be found in the United States Patent and Applications incorporated by reference above. This push technique uses a wireless friendly encoding, compression and encryption technique to deliver all information to a mobile device, thus effectively extending the company firewall 808 to include the mobile devices 816, 818.

As shown in FIG. 9, there are several paths for exchanging information with a mobile device 816, 818 from the corporate LAN 806. One possible information transfer path is through the physical connection 824 such as a serial port, using an interface or connector 826. This path may be useful for example for bulk information updates often performed at initialization of a mobile device 816, 818 or periodically when a user of a mobile device 816, 818 is working at a computer system in the LAN 806, such as the computer system 822. For example, as described above, PIM data is commonly exchanged over such a connection, for example a serial port connected to an appropriate interface or connector 826 such as a cradle in or upon which a mobile device 816, 818 may be placed. The physical connection 824 may also be used to transfer other information from a desktop computer system 822 to a mobile device 816, 818, including private security keys ("private keys") such as private encryption or signature keys associated with the desktop computer system 822, or other relatively bulky information such as Certs and CRLs, used in some secure messaging schemes such as S/MIME and PGP.

Private key exchange using a physical connection 824 and connector or interface 826 allows a user's desktop computer system 822 and mobile device 816 or 818 to share at least one identity for accessing all encrypted and/or signed mail. The user's desktop computer system 822 and mobile device 816 or 818 can also thereby share private keys so that either the host system 822 or mobile device 816 or 818 can process secure messages addressed to the user's mailbox or account on the message server 820. The transfer of Certs and CRLs over such a physical connection may be desirable in that they represent a large amount of the data that is required for S/MIME, PGP and other public key security methods. A user's own Cert, a chain of Cert(s) used to verify the user's Cert, and CRL, as well as Certs, Cert chains and CRLs for other users, may be loaded onto a mobile device 816, 818 from the user's desktop computer system 822. This loading of other user's Certs and CRLs onto a mobile device 816, 818 allows a mobile device user to select other entities or users with whom they might be exchanging secure messages, and to pre-load the bulky information onto the mobile device through a physical connection instead of over the air, thus saving time and wireless bandwidth when a secure message is received from or to be sent to such other users, or when the status of a Cert is to be determined.

In known "synchronization" type wireless messaging systems, a physical path has also been used to transfer messages from mailboxes 819 associated with a message server 820 to mobile devices 816 and 818.

Another method for data exchange with a mobile device 816, 818 is over-the-air, through the wireless connector system 828 and using wireless networks 812, 814. As shown in FIG. 9, this could involve a Wireless VPN router 832, if available in the network 806, or, alternatively, a traditional WAN connection to wireless infrastructure 810 that provides an interface to one or more wireless networks 812, 814. The Wireless VPN router 832 provides for creation of a VPN connection directly through a specific wireless network 812 to a wireless device 816. Such a Wireless VPN router 832 may be used in conjunction with a static addressing scheme such as IPV6.

If a wireless VPN router 832 is not available, then a link to a WAN 804, normally the Internet, is a commonly used connection mechanism that may be employed by the wireless connector system 828. To handle the addressing of the mobile device 816 and any other required interface functions, wireless infrastructure 810 is preferably used. The wireless infrastructure 810 may also determine a most likely wireless network for locating a given user, and track users as they roam between countries or networks. In wireless networks such as 812 and 814, messages are normally delivered to and from mobile devices 816, 818 via RF transmissions between base stations (not shown) and the mobile devices 816, 818.

A plurality of connections to wireless networks 812 and 814 may be provided, including, for example, ISDN, Frame Relay or T1 connections using the TCP/IP protocol used throughout the Internet. The wireless networks 812 and 814 could represent distinct, unique and unrelated networks, or they could represent the same network in different countries, and may be any of different types of networks, including but not limited to, data-centric wireless networks, voice-centric wireless networks, and dual-mode networks that can support both voice and data communications over the same or similar infrastructure, such as any of those described above.

In some implementations, more than one over-the-air information exchange mechanism may be provided in the corporate LAN 806. In the exemplary communication system of FIG. 9 for example, mobile devices 816, 818 associated with users having mailboxes 819 associated with user accounts on the message server 820 are configured to operate on different wireless networks 812 and 814. If the wireless network 812 supports IPv6 addressing, then the wireless VPN router 832 may be used by the wireless connector system 828 to exchange data with any mobile device 816 operating within the wireless network 812. The wireless network 814 may be a different type of wireless network, however, such as the Mobitex network, in which case information may instead be exchanged with a mobile device 818 operating within the wireless network 814 by the wireless connector system 828 via a connection to the WAN 804 and the wireless infrastructure 810.

Operation of the system in FIG. 9 will now be described using an example of an e-mail message 833 sent from the computer system 802 and addressed to at least one recipient having both an account and mailbox 819 or like data store associated with the message server 820 and a mobile device 816 or 818. However, the e-mail message 833 is intended for illustrative purposes only. The exchange of other types of information between the corporate LAN 806 is preferably also enabled by the wireless connector system 828.

The e-mail message 833, sent from the computer system 802 via the WAN 804, may be fully in the clear, or signed with a digital signature and/or encrypted, depending upon the particular messaging scheme used. For example, if the computer system 802 is enabled for secure messaging using S/MIME, then the e-mail message 833 may be signed, encrypted, or both.

E-mail messages such as 833 normally use traditional SMTP, RFC822 headers and MIME body parts to define the format of the e-mail message. These techniques are all well known to one in the art. The e-mail message 833 arrives at the message server 820, which determines into which mailboxes 819 the e-mail message 833 should be stored. As described above, a message such as the e-mail message 833 may include a user name, a user account, a mailbox identifier, or other type of identifier that may be mapped to a particular account or associated mailbox 819 by the message server 820. For an e-mail message 833, recipients are typically identified using e-mail addresses corresponding to a user account and thus a mailbox 819.

The wireless connector system 828 sends or mirrors, via a wireless network 812 or 814, certain user-selected data items or parts of data items from the corporate LAN 806 to the user's mobile device 816 or 818, preferably upon detecting that one or more triggering events has occurred. A triggering event includes, but is not limited to, one or more of the following: screen saver activation at a user's networked computer system 822, disconnection of the user's mobile device 816 or 818 from the interface 826, or receipt of a command sent from a mobile device 816 or 818 to the host system to start sending one or more messages stored at the host system. Thus, the wireless connector system 828 may detect triggering events associated with the message server 820, such as receipt of a command, or with one or more networked computer systems 822, including the screen saver and disconnection events described above. When wireless access to corporate data for a mobile device 816 or 818 has been activated at the LAN 806, when the wireless connector system 828 detects the occurrence of a triggering event for a mobile device user, for example, data items selected by the user are preferably sent to the user's mobile device. In the example of the e-mail message 833, once a triggering event has been detected, the arrival of the message 833 at the message server 820 is detected by the wireless connector system 828. This may be accomplished, for example, by monitoring or querying mailboxes 819 associated with the message server 820, or, if the message server 820 is a Microsoft Exchange server, then the wireless connector system 828 may register for advise syncs provided by the Microsoft Messaging Application Programming Interface (MAPI) to thereby receive notifications when a new message is stored to a mailbox 819.

When a data item such as the e-mail message 833 is to be sent to a mobile device 816 or 818, the wireless connector system 828 preferably repackages the data item in a manner that is transparent to the mobile device, so that information sent to and received by the mobile device appears similar to the information as stored on and accessible at the host system, LAN 806 in FIG. 9. One preferred repackaging method includes wrapping received messages to be sent via a wireless network 812, 814 in an electronic envelope that corresponds to the wireless network address of the mobile device 816, 818 to which the message is to be sent. Alternatively, other repackaging methods could be used, such as special-purpose TCP/IP wrapping techniques. Such repackaging preferably also results in e-mail messages sent from a mobile device 816 or 818 appearing to come from a corresponding host system account or mailbox 819 even though they are composed and sent from a mobile device. A user of a mobile device 816 or 818 may thereby effectively share a single e-mail address between a host system account or mailbox 819 and the mobile device.

Repackaging of the e-mail message 833 is indicated at 834 and 836. Repackaging techniques may be similar for any available transfer paths or may be dependent upon the particular transfer path, either the wireless infrastructure 810 or the wireless VPN router 832. For example, the e-mail message 833 is preferably compressed and encrypted, either before or after being repackaged at 834, to thereby effectively provide for secure transfer to the mobile device 818. Compression reduces the bandwidth required to send the message, whereas encryption ensures confidentiality of any messages or other information sent to mobile devices 816 and 818. In contrast, messages transferred via a VPN router 832 might only be compressed and not encrypted, since a VPN connection established by the VPN router 832 is inherently secure. Messages are thereby securely sent, via either encryption at the wireless connector system 828, which may be considered a non-standard VPN tunnel or a VPN-like connection for example, or the VPN router 832, to mobile devices 816 and 818. Accessing messages using a mobile device 816 or 818 is thus no less secure than accessing mailboxes at the LAN 806 using the desktop computer system 822.

When a repackaged message 834 or 836 arrives at a mobile device 816 or 818, via the wireless infrastructure 810, or via the wireless VPN router 832, the mobile device 816 or 818 removes the outer electronic envelope from the repackaged message 834 or 836, and performs any required decompression and decryption operations. Messages sent from a mobile device 816 or 818 and addressed to one or more recipients are preferably similarly repackaged, and possibly compressed and encrypted, and sent to a host system such as the LAN 806. The host system then removes the electronic envelope from the repackaged message, decrypts and decompresses the message if desired, and routes the message to the addressed recipients.

Another goal of using an outer envelope is to maintain at least some of the addressing information in the original e-mail message 833. Although the outer envelope used to route information to mobile devices 816, 818 is addressed using a network address of one or more mobile devices, the outer envelope preferably encapsulates the entire original e-mail message 833, including at least one address field, possibly in compressed and/or encrypted form. This allows original "To", "From" and "CC" addresses of the e-mail message 833 to be displayed when the outer envelope is removed and the message is displayed on a mobile device 816 or 818. The repackaging also allows reply messages to be delivered to addressed recipients, with the "From" field reflecting an address of the mobile device user's account or mailbox on the host system, when the outer envelope of a repackaged outgoing message sent from a mobile device is removed by the wireless connector system 828. Using the user's account or mailbox address from the mobile device 816 or 818 allows a message sent from a mobile device to appear as though the message originated from the user's mailbox 819 or account at the host system rather than the mobile device.

FIG. 10 is a block diagram of an alternative exemplary communication system, in which wireless communications are enabled by a component associated with an operator of a wireless network. As shown in FIG. 10, the system includes a computer system 802, WAN 804, a corporate LAN 807 located behind a security firewall 808, network operator infrastructure 840, a wireless network 811, and mobile devices 813 and 815. The computer system 802, WAN 804, security firewall 808, message server 820, data store 817, mailboxes 819, and VPN router 835 are substantially the same as the similarly-labelled components in FIG. 9. However, since the VPN router 835 communicates with the network operator infrastructure 840, it need not necessarily be a wireless VPN router in the system of FIG. 10. The network operator infrastructure 840 enables wireless information exchange between the LAN 807 and mobile devices 813, 815, respectively associated with the computer systems 842 and 852 and configured to operate within the wireless network 811. In the LAN 807, a plurality of desktop computer systems 842, 852 are shown, each having a physical connection 846, 856 to an interface or connector 848, 858. A wireless connector system 844, 854 is operating on or in conjunction with each computer system 842, 852.

The wireless connector systems 844, 854 are similar to the wireless connector system 828 described above, in that it enables data items, such as e-mail messages and other items that are stored in mailboxes 819, and possibly data items stored in a local or network data store, to be sent from the LAN 807 to one or more mobile devices 813, 815. In FIG. 10 however, the network operator infrastructure 840 provides an interface between the mobile devices 813, 815 and the LAN 807. As above, operation of the system shown in FIG. 10 will be described below in the context of an e-mail message as an illustrative example of a data item that may be sent to a mobile device 813, 815.

When an e-mail message 833, addressed to one or more recipients having an account on the message server 820, is received by the message server 820, the message, or possibly a pointer to a single copy of the message stored in a central mailbox or data store, is stored into the mailbox 819 of each such recipient. Once the e-mail message 833 or pointer has been stored to a mailbox 819, it may be accessed using a mobile device 813 or 815. In the example shown in FIG. 10, the e-mail message 833 has been addressed to the mailboxes 819 associated with both desktop computer systems 842 and 852 and thus both mobile devices 813 and 815.

As those skilled in the art will appreciate, communication network protocols commonly used in wired networks such as the LAN 807 and/or the WAN 804 are not suitable or compatible with wireless network communication protocols used within wireless networks such as 811. For example, communication bandwidth, protocol overhead and network latency, which are primary concerns in wireless network communications, are less significant in wired networks, which typically have much higher capacity and speed than wireless networks. Therefore, mobile devices 813 and 815 cannot normally access the data store 817 directly. The network operator infrastructure 840 provides a bridge between the wireless network 811 and the LAN 807.

The network operator infrastructure 840 enables a mobile device 813, 815 to establish a connection to the LAN 807 through the WAN 804, and may, for example, be operated by an operator of the wireless network 811 or a service provider that provides wireless communication service for mobile devices 813 and 815. In a pull-based system, a mobile device 813, 815 may establish a communication session with the network operator infrastructure 840 using a wireless network compatible communication scheme, preferably a secure scheme such as Wireless Transport Layer Security (WTLS) when information should remain confidential, and a wireless web browser such as a Wireless Application Protocol (WAP) browser. A user may then request (through manual selection or pre-selected defaults in the software residing in the mobile device) any or all information, or just new information, stored in a mailbox 819 in the data store 817 at the LAN 807. The network operator infrastructure 840 then establishes a connection or session with a wireless connector system 844, 854, using Secure Hypertext Transfer Protocol (HTTPS), for example, if no session has already been established. As above, a session between the network operator infrastructure 840 and a wireless connector system 844, 854 may be made via a typical WAN connection or through the VPN router 835 if available. When time delays between receiving a request from a mobile device 813, 815 and delivering requested information back to the device are to be minimized, the network operator infrastructure 840 and the wireless connector systems 844, 854 may be configured so that a communication connection remains open once established.

In the system of FIG. 10, requests originating from mobile device A 813 and B 815 would be sent to the wireless connector systems 844 and 854, respectively. Upon receiving a request for information from the network operator infrastructure 840, a wireless connector system 844, 854 retrieves requested information from a data store. For the e-mail message 833, the wireless connector system 844, 854 retrieves the e-mail message 833 from the appropriate mailbox 819, typically through a messaging client operating in conjunction with the computer system 842, 852, which may access a mailbox 819 either via the message server 820 or directly. Alternatively, a wireless connector system 844, 854 may be configured to access mailboxes 819 itself, directly or through the message server 820. Also, other data stores, both network data stores similar to the data store 817 and local data stores associated with each computer system 842, 852, may be accessible to a wireless connector system 844, 854, and thus to a mobile device 813, 815.

If the e-mail message 833 is addressed to the message server accounts or mailboxes 819 associated with both computer systems 842 and 852 and devices 813 and 815, then the e-mail message 833 may be sent to the network operator infrastructure 840 as shown at 860 and 862, which then sends a copy of the e-mail message to each mobile device 813 and 815, as indicated at 864 and 866. Information may be transferred between the wireless connector systems 844, 854 and the network operator infrastructure 840 via either a connection to the WAN 804 or the VPN router 835. When the network operator infrastructure 840 communicates with the wireless connector systems 844, 854 and the mobile devices 813, 815 via different protocols, translation operations may be performed by the network operator infrastructure 840. Repackaging techniques may also be used between the wireless connector systems 844, 854 and the network operator infrastructure 840, and between each mobile device 813, 815 and the network operator infrastructure 840.

Messages or other information to be sent from a mobile device 813, 815 may be processed in a similar manner, with such information first being transferred from a mobile device 813, 815 to the network operator infrastructure 840. The network operator infrastructure 840 may then send the information to a wireless connector system 844, 854 for storage in a mailbox 819 and delivery to any addressed recipients by the message server 820, for example, or may alternatively deliver the information to the addressed recipients.

The above description of the system in FIG. 10 relates to pull-based operations. The wireless connector systems 844, 854 and the network operator infrastructure may instead be configured to push data items to mobile devices 813 and 815. A combined push/pull system is also possible. For example, a notification of a new message or a list of data items currently stored in a data store at the LAN 807 could be pushed to a mobile device 813, 815, and then be used to request messages or data items from the LAN 807 via the network operator infrastructure 840.

If mobile devices associated with user accounts on the LAN 807 are configured to operate within different wireless networks, then each wireless network may have an associated wireless network infrastructure component similar to 840.

Although separate, dedicated wireless connector systems 844, 854 are shown for each computer system 842, 852 in the system of FIG. 10, one or more of the wireless connector systems 844, 854 may preferably be configured to operate in conjunction with more than one computer system 842, 852, or to access a data store or mailbox 819 associated with more than one computer system. For example, the wireless connector system 844 may be granted access to the mailboxes 819 associated with both the computer system 842 and the computer system 852. Requests for data items from either mobile device A 813 or B 815 may then be processed by the wireless connector system 844. This configuration may be useful to enable wireless communications between the LAN 807 and the mobile devices 813 and 815 without requiring a desktop computer system 842, 852 to be running for each mobile device user. A wireless connector system may instead be implemented in conjunction with the message server 820 to enable wireless communications.

FIG. 11 is a block diagram of another alternative communication system. The system includes a computer system 802, WAN 804, a corporate LAN 809 located behind a security firewall 808, an access gateway 880, data store 882, wireless networks 884 and 886, and mobile devices 888 and 890. In the LAN 809, the computer system 802, WAN 804, security firewall 808, message server 820, data store 817, mailboxes 819, desktop computer system 822, physical connection 824, interface or connector 826 and VPN router 835 are substantially the same as the corresponding components described above. The access gateway 880 and data store 882 provide mobile devices 888 and 890 with access to data items stored at the LAN 809. In FIG. 11, a wireless connector system 878 operates on or in conjunction with the message server 820, although a wireless connector system may instead operate on or in conjunction with one or more desktop computer systems in the LAN 809.

The wireless connector system 878 provides for transfer of data items stored at the LAN 809 to one or more mobile devices 888, 890. These data items preferably include e-mail messages stored in mailboxes 819 in the data store 817, as well as possibly other items stored in the data store 817 or another network data store or a local data store of a computer system such as 822.

As described above, an e-mail message 833 addressed to one or more recipients having an account on the message server 820 and received by the message server 820 is stored into the mailbox 819 of each such recipient. In the system of FIG. 11, the external data store 882 preferably has a similar structure to, and remains synchronized with, the data store 817. PIM information or data stored at data store 882 is preferably independently modifiable to the PIM information or data stored at the host system. In this particular configuration, the independently modifiable information at the external data store 882 may maintain synchronization of a plurality of data stores associated with a user (i.e., data on a mobile device, data on a personal computer at home, data at the corporate LAN, etc.). This synchronization may be accomplished, for example, through updates sent to the data store 882 by the wireless connector system 878 at certain time intervals, each time an entry in the data store 817 is added or changed, at certain times of day, or when initiated at the LAN 809, by the message server 820 or a computer system 822, at the data store 882, or possibly by a mobile device 888, 890 through the access gateway 880. In the case of the e-mail message 833, an update sent to the data store 882 some time after the e-mail message 833 is received may indicate that the message 833 has been stored in a certain mailbox 819 in the store 817, and a copy of the e-mail message will be stored to a corresponding storage area in the data store 882. When the e-mail message 833 has been stored in the mailboxes 819 corresponding to the mobile devices 888 and 890, for example, one or more copies of the e-mail message, indicated at 892 and 894 in FIG. 11, are sent to and stored in corresponding storage areas or mailboxes in the data store 882. As shown, updates or copies of stored information in the data store 817 may be sent to the data store 882 via a connection to the WAN 804 or the VPN router 835. For example, the wireless connector system 878 may post updates or stored information to a resource in the data store 882 via an HTTP post request. Alternatively, a secure protocol such as HTTPS or Secure Sockets Layer (SSL) may be used. Those skilled in the art will appreciate that a single copy of a data item stored in more than one location in a data store at the LAN 809 may instead be sent to the data store 882. This copy of the data item could then be stored either in more than one corresponding location in the data store 882, or a single copy may be stored in the data store 882, with a pointer or other identifier of the stored data item being stored in each corresponding location in the data store 882.

The access gateway 880 is effectively an access platform, in that it provides mobile devices 888 and 890 with access to the data store 882. The data store 882 may be configured as a resource accessible on the WAN 804, and the access gateway 880 may be an ISP system or WAP gateway through which mobile devices 888 and 890 may connect to the WAN 804. A WAP browser or other browser compatible with the wireless networks 884 and 886 may then be used to access the data store 882, which is synchronized with the data store 817, and download stored data items either automatically or responsive to a request from a mobile device 888, 890. As shown at 896 and 898, copies of the e-mail message 833, which was stored in the data store 817, may be sent to the mobile devices 888 and 890. A data store (not shown) on each mobile device 888, 890 may thereby be synchronized with a portion, such as a mailbox 819, of a data store 817 on a corporate LAN 809. Changes to a mobile device data store may similarly be reflected in the data stores 882 and 817.

It is claimed:

1. A system for distributing authentication information to a remote device, comprising:
   a computer-readable memory having an authentication information store configured to store, prior to receipt of a seed request, a plurality of seeds for a plurality of users; and
   a data processor executable authentication system configured to:
     receive from the remote device the seed request for one of the plurality of seeds, the seed request including identity information and a received access code;
     authenticate the seed request if the identity information is associated with one of the plurality of users;
     responsive to the authentication, retrieve the one of the plurality of seeds corresponding to the identity information from the authentication information store;
     calculate a calculated access code using the retrieved seed;
     determine whether the calculated access code matches the received access code; and
     return the retrieved seed to the remote device if the calculated access code matches the received access code.

2. The system of claim 1, wherein the authentication information is used in a two-factor authentication scheme.

3. The system of claim 1, wherein the seed request comprises a Hypertext Transfer Protocol (HTTP) connection request.

4. The system of claim 1, wherein the seed request comprises a network password and a digital signature, and wherein the network password and digital signature are verified by the authentication system before the authentication information is provided to the remote device.

5. The system of claim 1, wherein the identity information comprises user information and account information.

6. The system of claim 5, wherein the identity information identifies a particular user and corresponding authentication information being requested, and is used by the authentication system to authenticate the particular user requesting the authentication information.

7. The system of claim 1, wherein the identity information in the seed request is used by the remote device for two-factor authentication.

8. The system of claim 7, wherein the identity information comprises a network password entered by the user of the remote device and a digital signature generated based on a transformation of at least a portion of the information in the seed request, a signature key, and a signature algorithm.

9. The system of claim 1, wherein the authentication system does not provide the authentication information to the remote device if a match was not found in the authentication information store based upon the identity information.

10. The system of claim 1, wherein the remote device uses the retrieved seed to gain access to a corporate local area network (LAN).

11. The system of claim 10, wherein two-factor authentication is used in the LAN to authenticate a user requesting remote access to the LAN, and wherein the retrieved seed is used in performing two-factor authentication in order to gain access to the LAN.

12. The system of claim 1, wherein the remote device is a wireless mobile communication device.

13. The system of claim 12, wherein the remote device stores the retrieved seed in a data store.

14. The system of claim 13, wherein the data store is implemented in a smart card.

15. The system of claim 13, wherein the data store is implemented in a Universal Serial Bus (USB) token.

16. The system of claim 1, wherein the remote device is a desktop computer.

17. The system of claim 1, wherein the remote device communicates with the authentication system over a communication system, and wherein the communication system comprises a wide area network (WAN) and a wireless network gateway.

18. A method for distributing authentication information to a remote device using an authentication system, the method implemented using a computer-readable memory having an authentication information store storing, prior to receipt of a seed request, a plurality of seeds for a plurality of users; the method comprising:

receiving from the remote device, via a communication network, the seed request for one of the plurality of seeds, the seed request including identity information and a received access code;

authenticating the seed request if the identity information is associated with one of the plurality of users;

responsive to the authentication, retrieving the one of the plurality of seeds corresponding to the identity information from the authentication information store;

calculating, by a computer, a calculated access code using the retrieved seed;

determining, by the computer, whether the calculated access code matches the received access code; and returning the retrieved seed to the remote device if the calculated access code matches the received access code.

19. A non-transitory computer readable medium having an authentication information store storing, prior to receipt of a seed request, a plurality of seeds for a plurality of users, wherein the non-transitory computer readable medium further stores instructions comprising an authentication system which, when executed by a processor, implements a method for distributing authentication information to a remote device, the method comprising:

receiving from the remote device the seed request for one of the plurality of seeds, the seed request including identity information and a received access code;

authenticating the seed request if the identity information is associated with one of the plurality of users;

responsive to the authentication, retrieving the one of the plurality of seeds corresponding to the identity information from the authentication information store;

calculating a calculated access code using the retrieved seed;

determining whether the calculated access code matches the received access code; and returning the retrieved seed to the remote device if the calculated access code matches the received access code.

* * * * *